United States Patent
Hooda et al.

(10) Patent No.: US 10,999,197 B2
(45) Date of Patent: May 4, 2021

(54) END-TO-END IDENTITY-AWARE ROUTING ACROSS MULTIPLE ADMINISTRATIVE DOMAINS

(71) Applicant: Cisco Technology, Inc., San Jose, CA (US)

(72) Inventors: Sanjay Kumar Hooda, Pleasanton, CA (US); Anand Oswal, Pleasanton, CA (US); Nehal Bhau, San Jose, CA (US); Anil Edathara, San Jose, CA (US); Munish Mehta, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/535,519

(22) Filed: Aug. 8, 2019

(65) Prior Publication Data

US 2020/0177503 A1    Jun. 4, 2020

Related U.S. Application Data

(60) Provisional application No. 62/774,067, filed on Nov. 30, 2018.

(51) Int. Cl.
  *H04L 12/715*  (2013.01)
  *H04L 12/46*   (2006.01)

(52) U.S. Cl.
  CPC .......... *H04L 45/64* (2013.01); *H04L 12/4633* (2013.01); *H04L 12/4641* (2013.01); *H04L 2212/00* (2013.01)

(58) Field of Classification Search
  CPC ....... H04L 12/46; H04L 12/66; H04L 12/462; H04L 12/465; H04L 12/715;
  (Continued)

(56) References Cited

U.S. PATENT DOCUMENTS 8,830,835 B2 *  9/2014  Casado ................. H04L 41/044
                                                    370/235
9,019,837 B2    4/2015  Lue et al.
(Continued)

OTHER PUBLICATIONS

International Search Report and Written Opinion from the International Searching Authority, dated Feb. 4, 2020, 14 pages, for corresponding International Patent Application No. PCT/US2019/062292.

(Continued)

*Primary Examiner* — Tri H Phan
(74) *Attorney, Agent, or Firm* — Polsinelli PC

(57) ABSTRACT

Systems and methods provide for end-to-end identity-aware routing across multiple administrative domains. A first ingress edge device of a second overlay network can receive a first encapsulated packet from a first egress edge device of a first overlay network. The first ingress edge device can de-encapsulate the first encapsulated packet to obtain an original packet and a user or group identifier. The first ingress edge device can apply a user or group policy matching the user or group identifier to determine a next hop for the original packet. The first ingress edge device can encapsulate the original packet and the user or group identifier to generate a second encapsulated packet. The first ingress edge device can forward the second encapsulated packet to the next hop.

19 Claims, 9 Drawing Sheets

(58) Field of Classification Search
CPC ............ H04L 12/2859; H04L 12/4633; H04L 12/4641; H04L 12/4645; H04L 12/4654; H04L 12/4658; H04L 12/4662; H04L 12/4666; H04L 12/4675; H04L 29/06612; H04L 29/12575; H04L 41/08; H04L 45/00; H04L 45/64; H04L 47/825; H04L 49/00; H04L 61/2592; H04L 63/0428; H04L 63/0478; H04L 2212/00
See application file for complete search history.

(56) References Cited

U.S. PATENT DOCUMENTS

| | | |
|---|---|---|
| 9,083,650 B2 * | 7/2015 | Grundemann ........... H04L 45/14 |
| 9,240,944 B2 * | 1/2016 | Moreno .............. H04L 12/4633 |
| 9,467,478 B1 * | 10/2016 | Khan ....................... H04L 45/00 |
| 9,565,034 B2 * | 2/2017 | Moreno .............. H04L 12/4675 |
| 9,898,317 B2 * | 2/2018 | Nakil ....................... H04L 43/10 |
| 10,110,422 B2 * | 10/2018 | Yadav ..................... H04L 43/04 |
| 10,277,558 B2 * | 4/2019 | Khan ..................... H04L 63/205 |
| 2012/0182997 A1 | 7/2012 | Balus et al. |
| 2016/0036697 A1 | 2/2016 | DeCusatis et al. |

OTHER PUBLICATIONS

Smith, Michael, et al., "VXLAN group Policy Option," draft-smith-xvlan-group-policy-03, Feb. 6, 2017, 6 pages.

* cited by examiner

END-TO-END IDENTITY-AWARE ROUTING ACROSS MULTIPLE ADMINISTRATIVE DOMAINS

CROSS-REFERENCE TO RELATED APPLICATIONS

This application claims priority to U.S. Provisional Patent Application No. 62/774,067, filed on Nov. 30, 2018, the content of which is incorporated by reference in its entirety.

TECHNICAL FIELD

The subject matter of this disclosure relates in general to the field of computer networking, and more particularly, to systems and methods for identity-aware routing.

BACKGROUND

The enterprise network landscape is continuously evolving. There is a greater demand for mobile and Internet of Things (IoT) device traffic, Software as a Service (SaaS) applications, and cloud adoption. In addition, security needs are increasing and certain applications can require prioritization and optimization for proper operation. As this complexity grows, there is a push to reduce costs and operating expenses while providing for high availability and scale.

Conventional WAN architectures are facing major challenges under this evolving landscape. Conventional WAN architectures typically consist of multiple Multi-Protocol Label Switching (MPLS) transports, or MPLS paired with Internet or Long-Term Evolution (LTE) links used in an active/backup fashion, most often with Internet or SaaS traffic being backhauled to a central data center or regional hub for Internet access. Issues with these architectures can include insufficient bandwidth, high bandwidth costs, application downtime, poor SaaS performance, complex operations, complex workflows for cloud connectivity, long deployment times and policy changes, limited application visibility, and difficulty in securing the network.

In recent years, Software-Defined Wide-Area Network (SD-WAN) solutions have been developed to address these challenges. SD-WAN is part of a broader technology of software-defined networking (SDN). SDN is a centralized approach to network management which can abstract away the underlying network infrastructure from its applications. This de-coupling of data plane forwarding and control plane can allow a network operator to centralize the intelligence of the network and provide for more network automation, operations simplification, and centralized provisioning, monitoring, and troubleshooting. SD-WAN can apply these principles of SDN to the WAN.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
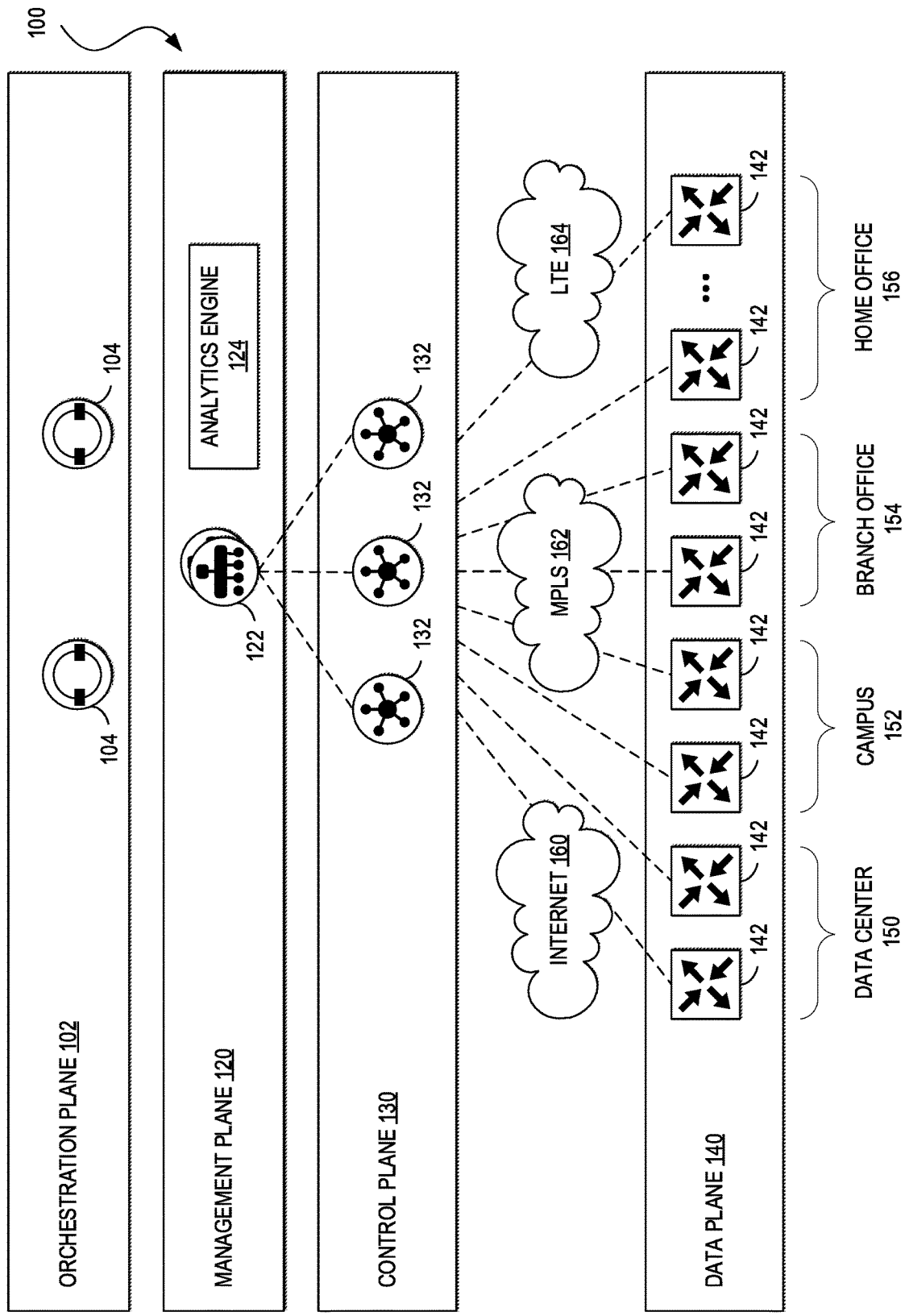
FIG. 1 illustrates a block diagram of an example of a network in accordance with an embodiment.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for end-to-end identity-aware routing across multiple administrative domains. A first ingress edge device of a second overlay network can receive a first encapsulated packet from a first egress edge device of a first overlay network. The first ingress edge device can de-encapsulate the first encapsulated packet to obtain an original packet and a user or group identifier. The first ingress edge device can apply a user or group policy matching the user or group identifier to determine a next hop for the original packet. The first ingress edge device can encapsulate the original packet and the user or group identifier to generate a second encapsulated packet. The first ingress edge device can forward the second encapsulated packet to the next hop.

Example Embodiments

In some embodiments, a computer-implemented method is provided for receiving, from an egress edge device of a first overlay network under administrative control of a first network controller by an ingress edge device of a second overlay network under administrative control of a second network controller, a first encapsulated packet including an original packet; de-encapsulating the first encapsulated packet to obtain the original packet and a user or group identifier; applying a user or group policy matching the user or group identifier to the original packet to determine a next hop for the original packet; encapsulating the original packet and the user or group identifier to generate a second encapsulated packet; and forwarding the second encapsulated packet to the next hop.

In some embodiments, at least one of the first encapsulated packet or the second encapsulated packet is encapsulated by Virtual Extensible Local Area Network (VXLAN)-Group Policy Option (GPO) encapsulation. In some embodiments, the user or group policy is an end-to-end user or group policy that is enforced in the first overlay network and the second overlay network. In some embodiments, the user or group identifier is included in at least one of a VXLAN header, a metadata header, or a Multi-Protocol Label Switching (MPLS) label. In some embodiments, at least one of the first encapsulated packet or the second encapsulated packet includes a Virtual Network Identifier (VNID), a Virtual Routing and Forwarding (VRF) identifier, or a Virtual Private Network (VPN) identifier.

In some embodiments, the computer-implemented method can further comprise establishing a tunnel between the ingress edge device and an egress edge device of the second overlay network, wherein the second encapsulated packet is forwarded to the next hop through the tunnel. receiving, by an egress edge device of the second overlay network, the second encapsulated packet; de-encapsulating the second encapsulated packet to obtain the original packet and the user or group identifier; applying a second user or group policy matching the user or group identifier to the original packet to determine a second next hop for the original packet; encapsulating the original packet and the user or group identifier to generate a third encapsulated packet; and forwarding the third encapsulated packet to the second next hop. In some embodiments, the computer-implemented can further comprise receiving, by a second ingress edge device under administrative control of the first overlay network or a third overlay network from the egress edge device, the third encapsulated packet; de-encapsulating the third encapsulated packet to obtain the original packet and the user or group identifier; applying a third user or group policy matching the user or group identifier to the original packet to determine a third next hop for the original packet; and forwarding the original packet to the third next hop.

In some embodiments, the computer-implemented method can further comprise mapping the user or group identifier from a Security Group Tag (SGT) to an Endpoint Group (EPG). In some embodiments, the user or group policy further matches an application that generated the original packet.

In some embodiments, the computer-implemented method can further comprise routing the first encapsulated packet through one or more intermediate nodes of an underlay network to the first overlay network.

In some embodiments, the computer-implemented method can further comprise routing the second encapsulated packet through one or more nodes of an underlay network to the second overlay network.

In some embodiments, a system is provided comprising one or more processors; and memory including instructions that, when executed by the one or more processors, cause the system to receive, from an egress edge device of a first overlay network under administrative control of a first network controller, a first encapsulated packet including an original packet, wherein the system is under administrative control of a second network controller; de-encapsulate the first encapsulated packet to obtain the original packet and a user or group identifier; apply a user or group policy matching the user or group identifier to the original packet to determine a next hop for the original packet; encapsulate the original packet and the user or group identifier to generate a second encapsulated packet; and forward the second encapsulated packet to the next hop.

In some embodiments, a non-transitory computer-readable storage medium including instructions that, when executed by one or more processors of a system, cause the system to receive, from an egress edge device of a first overlay network under administrative control of a first network controller, a first encapsulated packet including an original packet, wherein the system is under administrative control of a second network controller; de-encapsulate the first encapsulated packet to obtain the original packet and a user or group identifier; apply a user or group policy matching the user or group identifier to the original packet to determine a next hop for the original packet; encapsulate the original packet and the user or group identifier to generate a second encapsulated packet; and forward the second encapsulated packet to the next hop. Numerous other functions and advantages are described and suggested below as may be provided in accordance with the various embodiments.

The protocols used in conventional networks are designed and optimized for their particular domain or type of network (e.g., Data Center (DC); enterprise or campus, Wide Area Network (WAN), branch, etc.) but may be less effective for traffic flowing between domains (e.g., DC-campus, access-WAN, DC-WAN, etc.). For example, Layer 2 (L2) (of the Open Systems Interconnection (OSI) model) networks can be constrained by scale, broadcast propagation, and fragility when enabled over a wider area. Layer 3 (L3) networks can become unmanageable by the proliferation of Virtual Local Area Networks (VLANs) and subnets, complex routing protocol designs, and potential disparities between the L2 and L3 topology that can make understanding traffic flows and troubleshooting more difficult. Network segmentation can add further complexity with the deployment of VRFs, Multi-Protocol Label and Switching (MPLS) VPNs, Security Group Tags (SGTs), and EPGs, among other virtual network technologies.

Network encapsulation is an approach for addressing some of these challenges. Some types of encapsulation, such as Virtual Extensible LAN (VXLAN), have the added benefit of being able to process both L2 and L3 packets within a single encapsulation type. This can allow VXLAN encapsulation or similar technologies to transport packets across both L2 and L3 networks. This can be distinct, for example, from MPLS, which uses different methods to transport L3 packets (e.g., MPLS VPN) and L2 packets (e.g., Virtual Private LAN Services (VPLS) or Ethernet over MPLS (EoMPLS)). An advantage of encapsulation, generally, is the ability to build overlays within the network. An overlay network (sometimes also referred to as a network fabric or fabric) is a virtual network topology, built on top of an underlying physical network (i.e., the underlay network). An overlay network can create a logical topology used to virtually connect devices built on top of an arbitrary physical network topology. Some example approaches for implementing overlay networks include Generic Routing Encapsulation (GRE) or Multipoint GRE (mGRE), MPLS VPN or VPLS, Internet Protocol Security (IPsec) or Dynamic Multipoint Virtual Private Network (DMVPN), CAPWAP (Control and Provisioning of Wireless Access Points), VXLAN, Location/Identifier Separation Protocol (LISP), Cisco® Overlay Transport Virtualization (OTV), and Cisco® Application Centric Infrastructure (Cisco ACI™) among others.

In an overlay network, the logical topology of the overlay can be decoupled from the underlying network infrastructure. This can allow the overlay network to be designed separately from the underlay network, and to provide functions that the underlay network may itself not be able to accommodate. For example, an underlay network can be designed as a fully routed topology (e.g., routing all the way down to the Premise Wire Distribution (PWD) room or wiring closet). A fully routed topology (also sometimes known as routed access) can have some advantages, such as stability, scalability, quick re-convergence in the event of network outages, and effective traffic load balancing (e.g., via Equal Cost Multipath (ECMP), among others. However, a fully routed topology can also have certain drawbacks. For example, it may not be possible to extend a VLAN between two or more PWDs, which can limit flexibility for some applications that may require a subnet to appear in more than one place in the network. A fully routed topology may also require the generation, use, and ongoing support of a large number of subnets (e.g., one or more per PWD). In a large deployment, this can become untenable to manage and waste a large amount of Internet Protocol (IP) address space (e.g., each subnet must be sized to the maximum it might grow to in terms of the number of hosts it needs to support, which can result in wasted IP address space during deployment and use).

In some embodiments, a network can be configured to provide the benefits of an underlay transport network that is fully routed (e.g., stability, scalability, fast network re-convergence, effective traffic load-balancing, etc.) and a wider area network that offers flexible services (e.g., such as by "stretching" overlay IP subnets across wider areas, without incurring the traditional issues associated with the wide-scale use of Spanning Tree and large, looped L2 designs, etc.). Network devices (e.g., switches, routers, Wireless Local Area Network (WLAN) controllers, access points, network appliances, network services, etc.) can attach to the underlay network, and hosts (e.g., end users, devices, etc.) or actual users of the system can attach to the overlay network. This can enable the underlay network to be kept static and stable—promoting higher availability and continuity—but allow users, devices, and services to connect to and disconnect from the network at any time via the overlay network—allowing rapid deployment and operation of new network functionality for a network operator without placing the network at risk.

Additional advantages of an overlay network, at least with VXLAN encapsulation or similar technologies, can include backwards-compatibility and additional packet header space for augmenting network functionality. This additional space can carry information (e.g., metadata or data about the data) to provide further context on the proper handling of encapsulated packets. VXLAN or similar technologies utilize User Datagram Protocol (UDP) for outer encapsulation to transport packet metadata, such as an SGT and/or a VNID (e.g., as defined in the Internet Engineering Task Force (IETF) VXLAN Group Policy Option (GPO)), and various advantages can flow from these properties. UDP encapsulation can enable IP nodes to route VXLAN-encapsulated packets without explicitly configuring the nodes with new hardware or software for VXLAN processing. While the node having a source IP address in an outer VXLAN header of a VXLAN-encapsulated packet (i.e., a source VXLAN Tunnel Endpoint (VTEP) or a source Routing Locator (RLOC)) can be VXLAN-enabled in order to encapsulate the packet, and the node having a destination IP address in the outer UDP header (i.e., the destination VTEP/RLOC) can be VXLAN-enabled in order de-encapsulate the outer VXLAN header, intermediate network nodes (i.e., the nodes between the source and destination VTEPs/RLOCs), do not need to know about, understand, or interpret the inner VXLAN packet headers. This can allow VXLAN or similar technologies to provide an overlay network on top of the underlying, IP-based network infrastructure. In addition, the outer UDP packet header can include a Differentiated Services Code Point (DSCP) value, which can be copied from the inner DSCP value, so intermediate nodes can properly handle QoS even without having to understand VXLAN, or inspect the inner encapsulated packet.

VXLAN or similar technologies can provide a mechanism within the overlay network to transport VNIDs end-to-end. The VNIDs can correspond to VRFs, and the overlay network can support end-to-end VRF transport to allow packets entering one end of the overlay network to be tagged with their correct VRFs as they are encapsulated, and for the VRF to be determined at the de-encapsulating VXLAN node to obtain the context to forward the inner packet upon egress from the overlay network. Thus, an overlay network with VNID support can be aware of network segmentation and provide greater network security. This can also facilitate an end-to-end network segmentation scheme without having to touch every intermediate network node in the underlay.

SGTs can group similar users and devices in the network for the purposes of policy application. By associating similar users and devices based on their authentication or device profiles, network policies can be decoupled from the IP addresses or subnets assigned to those users and devices. This level of abstraction can improve group-based policies by making them more comprehensible to users and easier to deploy and maintain. In conventional networks, policies are strictly bound to IP addresses. This is because there are no fields in the IP header that directly provide user or device identity or group information, location, and other context, and IP addresses must be used instead as a proxy for context. The outcome of overloading IP addresses in this manner is the substantial number of subnets, Service Set Identifiers (SSIDs), and Access Control Lists (ACLs) needed to implement policy.

Conventional networks are typically incapable of supporting SGTs (or similar technologies) because of the difficulty of carrying the SGTs end-to-end in the data plane across heterogeneous networks that may have a mixture of old and new hardware and software (e.g., some older hardware and software cannot process SGTs). It would be ideal to be able to transport SGTs in-line or in-band with data packets as they move across the network, but in a conventional network, every network device and every network link must be capable of inserting, transporting, and/or removing SGTs. An overlay network that supports VXLAN-GPO encapsulation or similar technologies, however, can carry SGTs or equivalent contextual information end-to-end in the VXLAN packet header. For example, only ingress and egress nodes—and not intermediate nodes—may need to process SGTs. This backwards-compatibility makes group-based policies feasible even in large network deployments with large numbers of nodes that cannot handle VXLAN. Thus, instead of stripping useful contextual information (e.g., user or group identity) from packets when they arrive at an edge network device for transport over a WAN, this information can be used for improving routing (e.g., shaping traffic end-to-end to conform to Service Level Agreements (SLAs)), ensuring efficient utilization of transport resources, improving application/network responsiveness, and so forth. Conventional networks are incapable of capturing this additional contextual information and/or do not rely on such information for WAN routing. Various embodiments of the present disclosure can overcome these and other challenges of end-to-end identity aware routing across multiple administrative domains.

FIG. 1 illustrates an example of a network 100 for implementing aspects of the present technology. An example of an implementation of the network 100 is the Cisco® Software Defined Wide Area Network (SD-WAN) architecture. However, one of ordinary skill in the art will understand that, for the network 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill in the art will appreciate that such variations do not depart from the scope of the present disclosure.

In this example, the network 100 can comprise an orchestration plane 102, a management plane 120, a control plane 130, and a data plane 140. The orchestration plane 102 can assist in the automatic on-boarding of WAN edge devices 142 (e.g., switches, routers, etc.) in an overlay network. The orchestration plane 102 can include one or more physical or virtual network orchestrator appliances 104. The network orchestrator appliances 104 can perform the initial authentication of the WAN edge devices 142 and orchestrate connectivity between devices of the control plane 130 and the data plane 140. In some embodiments, the network orchestrator appliances 104 can also enable communication of devices located behind Network Address Translation (NAT). In some embodiments, physical or virtual Cisco® SD-WAN vBond appliances can operate as the network orchestrator appliances 104.

The management plane 120 can be responsible for central configuration and monitoring of a network. The management plane 120 can include one or more physical or virtual network management appliances 122. The network management appliances 122 can provide centralized management of the network via a graphical user interface to enable a user to monitor, configure, and maintain the WAN edge devices 142 and links (e.g., Internet transport network 160, Multi-Protocol Label Switching (MPLS) network 162, LTE network 164, etc.) in an underlay and overlay network. The network management appliances 122 can support multi-tenancy and enable centralized management of logically isolated networks associated with different entities (e.g., enterprises, divisions within enterprises, groups within divisions, etc.). Alternatively or in addition, the network management appliances 122 can be a dedicated network management system for a single entity. In some embodiments, physical or virtual Cisco® SD-WAN vManage appliances can operate as the network management appliances 122.

The management plane 120 can also include an analytics engine 124 for providing visibility into the performance of applications and the network over time, such as the best and worst performing applications, the most bandwidth consuming applications, anomalous applications families (e.g., applications whose bandwidth consumption change over a period of time), network availability and circuit availability, carrier health, best and worst performing tunnels, and so forth. The analytics engine 124 may include a user interface that can generate graphical representations of an overlay network and enable users to drill down to display the characteristics of a single carrier, tunnel, or application at a particular time. The user interface can serve as an interactive overview of the network and an entrance point for more details. In some embodiments, the user interface can display information for the last 24 hours and enable a user to drill down to select different time periods for different data sets to display. The user interface can also display data for network availability, WAN performance by carrier, and applications, among other network analytics.

In some embodiments, the analytics engine 124 can provide application performance with a Virtual Quality of Experience (vQoE) value, which can be customized for individual applications. This value can range from zero to ten, with zero being the worst performance and ten being the best. The analytics engine can calculate vQoE based on latency, loss, and jitter, and customize the calculation for each application.

The analytics engine 124 can offer insight into planning the WAN and into its operational aspects, from historical performance, to forecasting, to providing recommendations for optimizing the WAN. The analytics engine 124 can store months of data, apply machine learning algorithms, and provide unique insights and recommendations. For example, the analytics engine 124 can offer forecasting recommendations to plan for WAN sites that may need additional bandwidth in the next three to six months; what-if scenarios to help identify opportunities for balancing cost, performance, and availability of networks and applications; application-aware routing policies based on historical information to fine tune the WAN; recommended network service providers for a specific location; and so forth.

The control plane 130 can build and maintain a network topology and make decisions on where traffic flows. The control plane 130 can include one or more physical or virtual network controller appliances 132. The network controller appliances 132 can establish secure connections to each WAN edge device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliances 132 can operate as route reflectors. The network controller appliances 132 can also orchestrate secure connectivity in the data plane 140 between and among the WAN edge devices 142. For example, in some embodiments, the network controller appliances 132 can distribute crypto key information among the WAN edge devices 142. This can allow the network to support a secure network protocol or application (e.g., IPSec, Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliances 132.

The data plane 140 can be responsible for forwarding packets based on decisions from the control plane 130. The data plane 140 can include the WAN edge devices 142, which can be physical or virtual network devices. The WAN edge devices 142 can operate at the edges of various WAN sites associated with an organization, such as in one or more data centers 150, campus networks 152, branch offices 154, home offices 156, and so forth, or in the cloud (e.g., Infrastructure as a Service (IaaS), Platform as a Service (PaaS), SaaS, and other cloud service provider networks). The WAN edge devices 142 can provide secure data plane connectivity among WAN sites over one or more WAN transports network, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), LTE network 164 or other mobile networks (e.g., 3G, 4G, 5G, etc.), or other WAN technologies (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The WAN edge devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the WAN edge devices 142.

Figure 2:
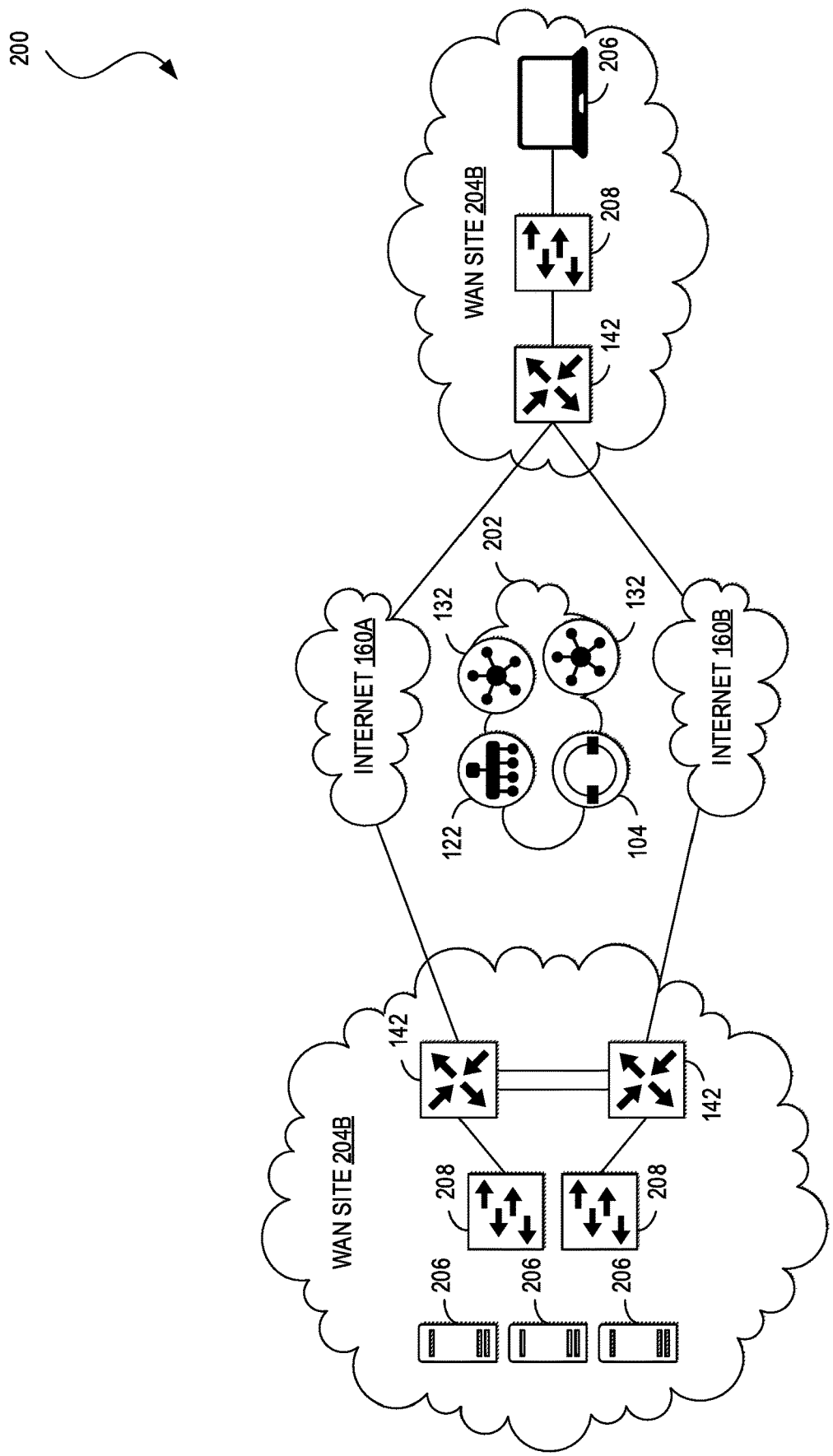
FIG. 2 illustrates a block diagram of an example of a network in accordance with an embodiment.

FIG. 2 illustrates an example of a network environment 200 for showing various aspects of the network 100. The network environment 200 can include a management network 202, a pair of WAN sites 204A and 204B (collectively, 204) (e.g., the data centers 150, the campus networks 152, the branch offices 154, the home offices 156, cloud service provider networks, etc.), and a pair of Internet transport networks 160A and 160B (collectively, 160). The management network 202 can include one or more network orchestrator appliances 104, one or more network management appliances 122, and one or more network controller appliances 132. Although the management network 202 is shown as a single network in this example, one of ordinary skill in the art will understand that each object of the management network 202 can be distributed across any number of networks and/or be co-located with the WAN sites 204. In this example, each object of the management network 202 can be reached through either Internet transport network 160A or 160B.

Each WAN site 204 can include one or more hosts 206 (sometimes also referred to as endpoints, computing devices, computing systems, etc.) connected to one or more WAN aggregation devices 208 (sometimes also referred to as access, edge, or border devices, nodes, or leafs, etc.). The hosts 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The hosts 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, Heating, Ventilation, and Air Conditioning (HVAC) equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The WAN aggregation devices 208 can include physical or virtual switches, routers, and other network devices. Although the WAN site 204A is shown including a pair of WAN aggregation devices and the WAN site 204B is shown including a single WAN aggregation device in this example, the WAN sites 204 can comprise any number of network devices in any network topology, including multi-tier (e.g., core, distribution, and access tiers), spine-and-leaf, mesh, tree, bus, hub and spoke, and so forth. For example, in some embodiments, one or more data centers may implement the Cisco® ACI™ architecture and/or one or more campus networks may implement the Cisco® Software Defined Access (SD-Access or SDA) architecture. The WAN aggregation devices 208 can directly or indirectly connect the nodes of the WAN sites 204, such as the hosts 206, other network devices (not shown), or other networks (not shown), and so forth, to one or more WAN edge devices 142, and the WAN edge devices 142 can connect the WAN aggregation devices 208 to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network environment 200 can utilize a color called "biz-internet" for the Internet transport network 160A and a color called "public-internet" for the Internet transport network 160B.

In some embodiments, each WAN edge device 142 can form a Datagram Transport Layer Security (DTLS) or Transport Layer Security (TLS) control connection with at least one of the network controller appliances 132 and connect to any network controller appliance 132 over each transport network 160. In some embodiments, the WAN edge devices 142 can also securely connect to WAN edge devices in other WAN sites via IPSec tunnels. In some embodiments, the BFD protocol may be used within each of these tunnels to detect loss, latency, jitter, and path failures.

On the WAN edge devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP hosts (e.g., because there may be no NAT between two hosts of the same color). When the WAN edge devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the WAN edge devices 142 to build tunnels to post-NAT IP addresses (if there is NAT involved). If the WAN edge devices 142 use private colors and need NAT to communicate to other private colors, the carrier setting in the configuration can dictate whether the WAN edge devices 142 use private or public IP addresses. Using this setting, two private colors can establish a session when one or both are using NAT.

Figure 3:
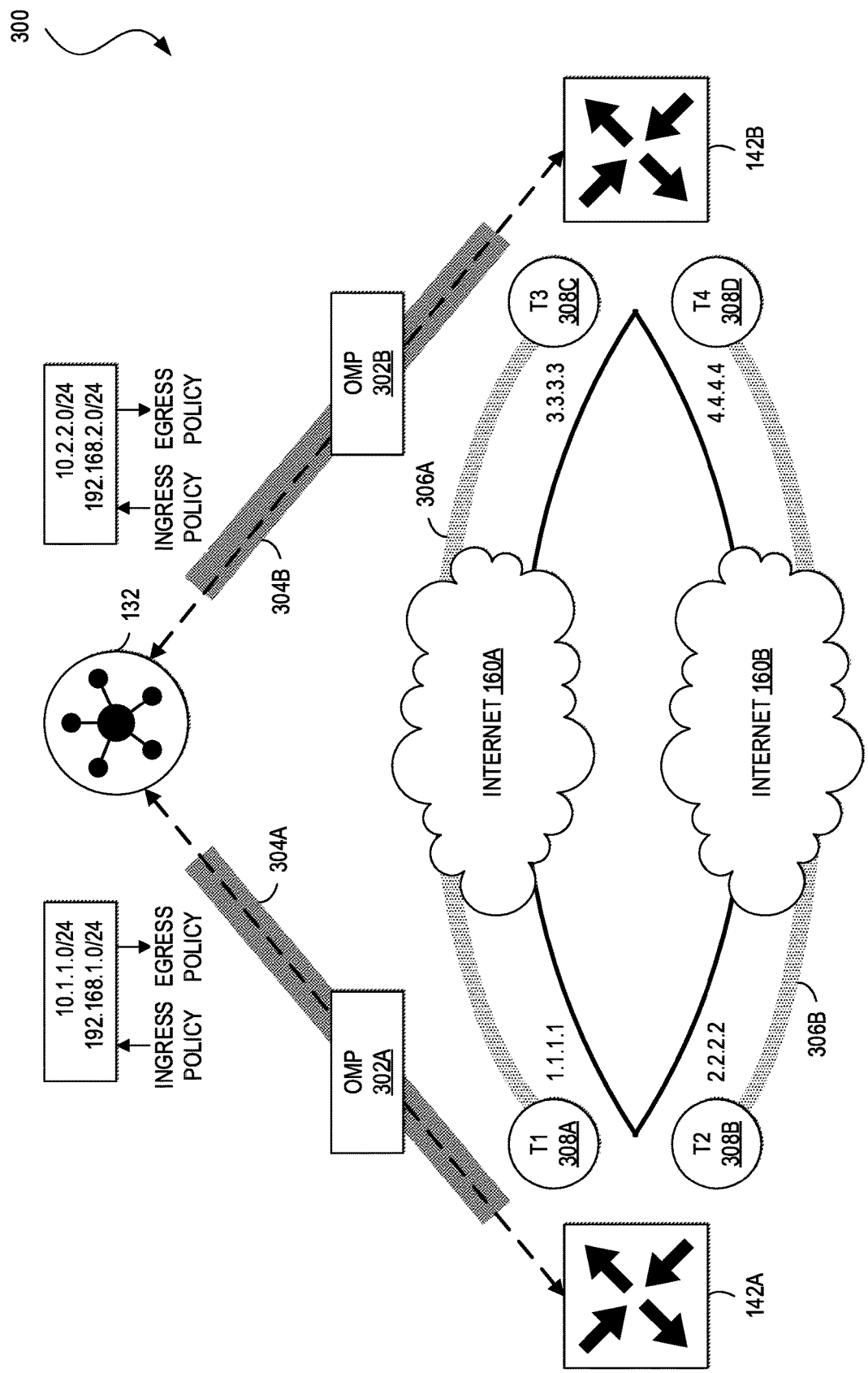
FIG. 3 illustrates a block diagram of an example of an approach for managing an overlay network in accordance with an embodiment.

FIG. 3 illustrates a block diagram 300 of an example approach for managing an overlay network, such as via OMP. In this example, OMP messages 302A and 302B (collectively, 302) may be transmitted back and forth between the network controller appliance 132 and the WAN edge devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the WAN edge devices 142, process and apply policies to them, and advertise routes to other WAN edge devices 142 in the overlay network. If there is no policy defined, the WAN edge devices 142 may behave in a manner similar to a full mesh topology, where each WAN edge device 142 can connect directly to another WAN edge device 142 at another WAN site and receive full routing information from each site.

OMP can advertise three types of routes:

OMP routes, which can correspond to prefixes that are learned from the local WAN site (e.g., local relative to the WAN edge device 142), or service side, of the WAN edge device 142. The prefixes can be originated as static or connected routes, or from within a routing protocol (e.g., BGP, OSPF, etc.), and redistributed into OMP so they can be carried across the overlay. OMP routes can advertise attributes such as transport location (TLOC) information (which can similar to a BGP next-hop IP address) and other attributes such as origin, originator, preference, site identifier, tag, and VPN identifier. An OMP route may be installed in the forwarding table if the TLOC to which it points is active.

TLOC routes, which can correspond to logical tunnel termination points on the WAN edge devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular WAN edge device 142 when an active BFD session is associated with that TLOC.

Service routes, which can represent services (e.g., firewall, distributed denial of service (DDoS) mitigator, load balancer, Intrusion Prevent System (IPS), Intrusion Detection Systems (IDS), WAN optimizer, etc.) that may be connected to the local WAN sites of the WAN edge devices 142 and accessible to other WAN sites for use with service insertion. In addition, these routes can also include VPNs; the VPN labels can be sent in an update type to tell the network controller appliance 132 what VPNs are serviced at a remote WAN site.

In the example of FIG. 3, OMP is shown running over the DTLS/TLS tunnels 304 established between the WAN edge devices 142 and the network controller appliance 132. In addition, the block diagram 300 shows an IPSec tunnel 306A established between TLOC 308A and 308C over the Internet transport network 160A and an IPSec tunnel 306B established between TLOC 308B and TLOC 308D over the Internet transport network 160B. Once the IPSec tunnels 306A and 306B are established, BFD can be enabled across each of them.

In some embodiments, network-wide segmentation can be implemented by defining groupings of network objects (e.g., subnets, VLANs, VNIDs, VRFs, VPNs, EPGs, etc.) at the edges of the network (e.g., the WAN edge devices 142), and carrying segmentation information in the packets for intermediate nodes to handle. For example, the WAN edge device 142A can subscribe to two VPNs, a "red" VPN corresponding to the prefix 10.1.1.0/24 (e.g., either directly through a connected interface or learned via Internal Gateway Protocol (IGP) or BGP), and a "blue" VPN corresponding to the prefix 10.2.2.0/24. The WAN edge device 142B can likewise subscribe to two VPNs, the red VPN, corresponding to the prefix 192.168.1.0/24, and the blue VPN, corresponding to the prefix 192.168.2.0/24 (either directly through a connected interface or learned via IGP or BGP).

Because the WAN edge devices 142 have OMP connections over the DTLS/TLS tunnels 304 to the network controller appliance 132, they can propagate their routing information to the network controller appliance 132. On the network controller appliance 132, a network administrator can enforce policies to drop routes, to change TLOCs (which can be overlay next hops) for traffic engineering or service chaining, or to change the VPN identifier. The network administrator can apply these policies as inbound or outbound policies on the network controller appliance 132.

Prefixes belonging to a single VPN can be kept in a separate route table. This can provide L3 isolation for the various segments in the network. Thus, the WAN edge devices 142 can each have two VPN route tables. In addition, the network controller appliance 132 can maintain the VPN context of each prefix. Separate route tables can provide isolation on a single node. In some embodiments, VPN identifiers can be used to propagate routing information across the network. A VPN identifier carried in a packet can identify each VPN on a link. When a VPN is configured on a particular edge network device, the VPN can have a link color or label associated with it. The edge network device can send the link color or label, along with the VPN identifier, to the network controller appliance 132. The network controller appliance 132 can propagate information mapping the edge network device to the VPN identifier to other edge network devices in the network. Remote edge network devices can then use the link color or label to send traffic to the appropriate VPN. Local edge network devices, on receiving the data with the VPN identifier link color or label, can use the link color or label to demultiplex the data traffic. In this example, the transport networks 160 that connect the WAN edge devices 142 can be unaware of the VPNs, the WAN edge devices 142 may know about VPNs, and the rest of the network can follow standard routing.

In some embodiments, policy can be used to influence the flow of traffic among the WAN edge devices 142. Policy can be characterized as centralized or local. Centralized policy can be provisioned on the network controller appliance 132, and localized policy can be provisioned on the WAN edge devices 142, which may sit at the network edge between WAN sites and a transport network, such as the Internet transport network 160, MPLS network 162, LTE network 164, and so forth.

Policy can also be characterized as control or routing policy, which may affect the flow of routing information in the network's control plane, or data policy, which may affect the flow of data traffic in the network's data plane. Centralized control policy can apply to the network-wide routing of traffic by affecting the information that is stored in the master route table of the network controller appliance 132 and that is advertised to the WAN edge devices 142. The effects of centralized control policy can be seen in how the WAN edge devices 142 direct traffic to its destination. The centralized control policy configuration itself can remain on the network controller appliance 132 and not be pushed to the WAN edge devices 142.

When no centralized control policy is provisioned, all OMP routes can be placed in the master route table of the network controller appliance 132, and the network controller appliance 132 can advertise all OMP routes to all of the WAN edge devices 142 in the same segment (e.g., subnet, VLAN, VNID, VRF, VPN, EPG, or other collection of hosts). By provisioning centralized control policy, an administrator or other user can affect which OMP routes are placed in the master route table of the network controller appliance 132, what route information is advertised to the WAN edge devices 142, and whether the OMP routes are modified before being put into the master route table or before being advertised.

When centralized control policy is provisioned, the network controller appliance 132 can redistribute route information to the WAN edge devices 142 or modify the route information that is stored in the master route table of the network controller appliance 132 or that is advertised by the network controller appliance 132. The network controller appliance 132 can activate the control policy by applying it to specific sites in the WAN in either the inbound or the outbound direction (with respect to the network controller appliance 132). Applying a centralized control policy in the inbound direction can filter or modify the routes being advertised by the WAN edge devices 142 before they are placed in the master route table on the network controller appliance 132. As the first step in the process, routes can be accepted or rejected. Accepted routes can be installed in the master route table on the network controller appliance 132 either as received or as modified by the control policy. Routes that are rejected by a control policy can be silently discarded.

Applying a control policy in the outbound direction can filter or modify the routes that the network controller appliance 132 redistributes to the WAN edge devices 142. As the first step of an outbound policy, routes can either be accepted or rejected. For accepted routes, centralized control policy can modify the routes before they are distributed by the network controller appliance 132. Routes that are rejected by an outbound policy are not advertised.

The WAN edge devices 142 can place route information learned from the network controller appliance 132 into their local route tables for use when forwarding data traffic. Because the network controller appliance 132 can operate as the centralized routing system in the network, the WAN edge devices 142 do not modify the OMP route information that they learn from the network controller appliance 132. The network controller appliance 132 can regularly receive OMP route advertisements from the WAN edge devices 142 and, after recalculating and updating the routing paths through the network, the network controller appliance 132 can advertise new routing information to the WAN edge devices 142.

The centralized control policy provisioned on the network controller appliance 132 can remain on the network controller appliance and not be downloaded to the WAN edge devices 142. However, the routing decisions that result from centralized control policy can be passed to the WAN edge devices 142 in the form of route advertisements, and so the effect of the control policy can be reflected in how the WAN edge devices 142 direct data traffic to its destination.

Localized control policy can be provisioned locally on the WAN edge devices 142. Localized control policy can be similar to the routing policies configured on a conventional router, such as how BGP and OSPF routing (or other routing protocol) behavior can be modified within a local WAN site. Localized data policy can allow for provisioning and application of access lists to a specific interface or interfaces on the WAN edge devices 142. Simple access lists can permit and restrict access based on a 6-tuple match (e.g., source and destination IP addresses and ports, DSCP fields, and protocol), in the same way as with centralized data policy. Access lists can also allow provisioning of class of service (CoS), policing, and mirroring, which can control how data traffic flows out of and in to the interfaces and interface queues of the WAN edge devices 142.

Centralized data policy can apply to the flow of data traffic throughout the network. When no centralized data policy is provisioned, all prefixes within a particular network segment (e.g., subnet, VLAN, VNID, VRF, VPN, EPG, or other network segment technology) may be reachable from that segment. Provisioning centralized data policy can apply a 6-tuple filter that controls access between sources and destinations. As with centralized control policy, centralized data policy can be provisioned on the network controller appliance 132, and that configuration can remain on the network controller appliance 132. The effects of data policy can be reflected in how the WAN edge devices 142 direct data traffic to its destination. Unlike control policy, however, centralized data policies may be pushed to the WAN edge devices 142 in a read-only fashion.

In some embodiments, centralized data policies can be configured on the network controller appliance 132 using lists, policy definition (or policies), and policy application. Lists can define the targets of policy application or matching. Some examples of lists can include prefix lists (e.g., list of prefixes for use with policies), site lists (e.g., list of site identifiers for use in policy definitions and policy applications), TLOC lists (e.g., lists of TLOCs for use in policy definitions), and VPN lists (e.g., list of VPNs for use in policy) or lists of other network segments (e.g., subnets, VLANs, VNIDs, VRFs, EPGs, or other network segmentation technology). Policy definition (or policies) can control aspects of control and forwarding. Policy definition (or policies) can include different types of policies, such as control policies, data policies, and Zone-based Firewall (ZFW) policies (e.g., policies defining zones and controlling traffic between zones). Policy application can control what a policy is applied towards. Policy application can be site-oriented, and can be defined by the site-list.

Figure 4:
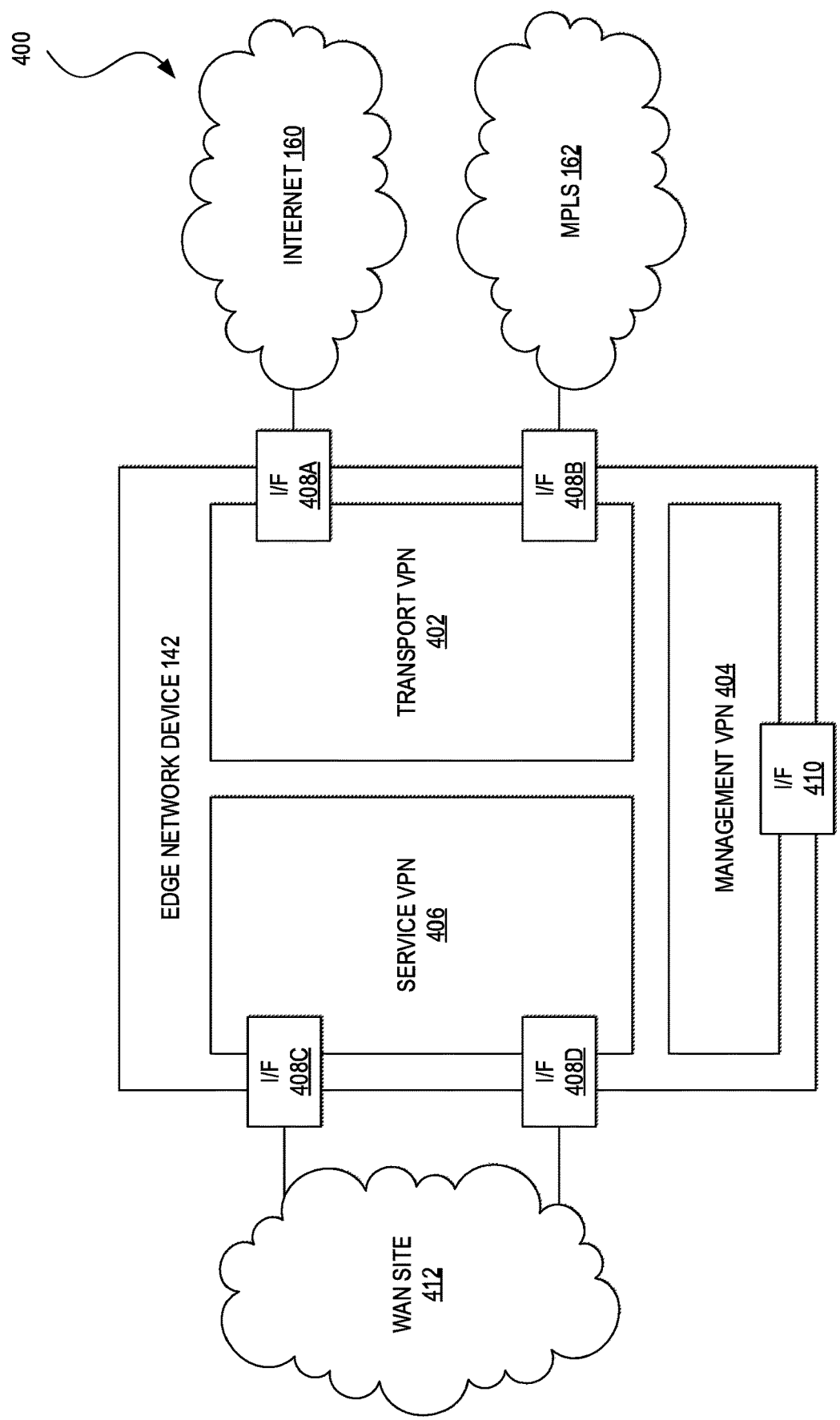
FIG. 4 illustrates a block diagram of an example of an approach for segmenting a network in accordance with an embodiment.

FIG. 4 illustrates a block diagram 400 of an example of an approach for segmenting a network using VPNs. VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, each WAN edge device 142 can include a transport VPN 402 (e.g., VPN number zero) and a management VPN 404 (e.g., VPN number five-hundred twelve). The transport VPN 402 can include one or more physical or virtual network interfaces (e.g., Gigabit Ethernet network interfaces 408A and 408B) that respectively connect to WAN transport networks (e.g., the Internet transport network 160 and the MPLS network 162). Secure DTLS/TLS connections to the network controller appliances 132 or between the network controller appliances 132 and the network orchestrator appliances 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote WAN sites.

The management VPN 404 can carry out-of-band management traffic to and from the network orchestrator appliances 104, network management appliances 122, network controller appliances 132, and/or WAN edge devices 142 over a management network interface 410. In some embodiments, the management VPN 404 may not be carried across the overlay network.

In addition to the transport VPN 402 and the management VPN 404, each WAN edge device 142 can also include one or more other service VPNs 406. The service VPN 406 can include one or more physical or virtual network interfaces (e.g., Gigabit Ethernet network interfaces 408C and 408D) that connect to one or more local WAN sites 204 (i.e., local relative to the WAN edge device 142) and carry data traffic. The service VPN 406 can be configured to provide features such as OSPF or BGP, Virtual Router Redundancy Protocol (VRRP), QoS, traffic shaping, policing, and so forth. In some embodiments, data traffic can be directed over IPSec tunnels to other WAN sites by redistributing OMP routes received from the network controller appliances 132 at the WAN site 204 into the routing protocol configured for the service VPN 406. In turn, routes from the local WAN site 204 can be advertised to other WAN sites by advertising the service VPN routes into the OMP routing protocol, which can be sent to the network controller appliances 132 and be redistributed to other WAN edge devices 142 in the network.

Figure 5:
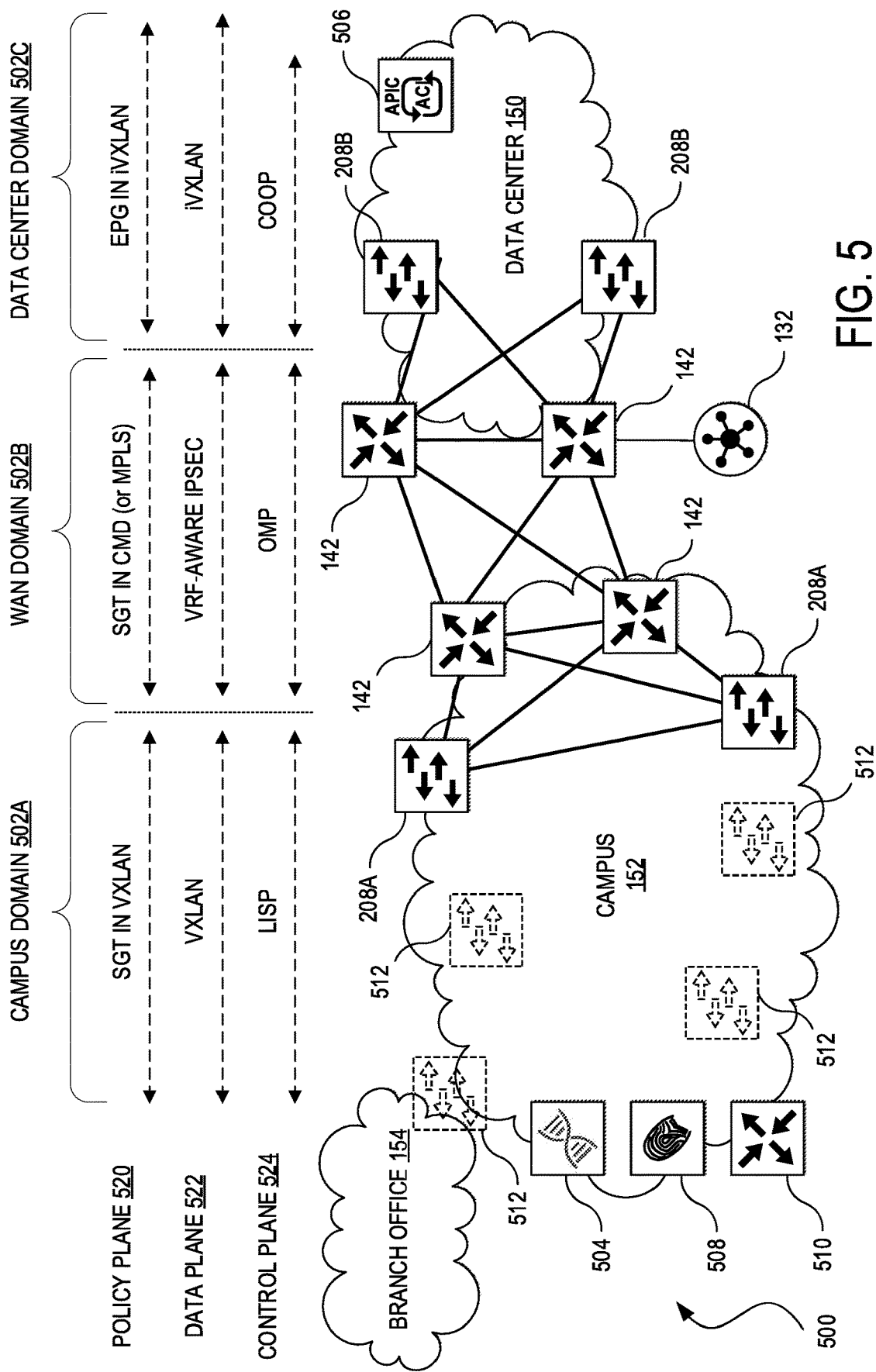
FIG. 5 illustrates a block diagram of an example of a network in accordance with an embodiment.

FIG. 5 illustrates a block diagram of an example of a multi-domain network 500 that is capable of identity-aware routing. The multi-domain network 500 includes a campus administrative domain 502A, a WAN administrative domain 502B, and a data center administrative domain 502C (collectively, 502). The campus administrative domain 502A can have administrative control over the campus network 152 and the branch office 154 via a campus network controller 504 (e.g., Cisco DNA™ Center), the WAN administrative domain 502B can have administrative control over the WAN (e.g., the network between the campus network 152 and the data center 150) (not explicitly shown) via the WAN controller 132, and the data center administrative domain 502C can have administrative control over the data center 150 via a data center network controller 506 (e.g., the Cisco® Application Policy Infrastructure Controller (Cisco APIC™)). That is, the campus administrative domain 502A can have administrative control over the WAN aggregation devices 208A and other network devices 512 (e.g., physical or virtual switches, routers, network appliances, network services, etc.) in the campus network 152 or branch office 154, the WAN administrative domain 502B can have administrative control over the WAN edge devices 142, and the data center administrative domain 502C can have administrative control over the WAN aggregation devices 208B. As used herein, the data center 150 and the campus network 152 can be referred to as WAN sites of the WAN administrative domain 502B or the WAN controller 132 because the WAN controller 132 can provide interconnectivity between these sites over the WAN. The campus network 152 and the branch office 154 can be referred to as fabric sites of the campus administrative domain 502A or the campus network controller 504 because the campus network controller can provide interconnectivity these sites within the campus administrative domain.

In this example, the WAN aggregation devices 208A can operate as ingress edge devices for receiving traffic from nodes (e.g., hosts, network devices, etc.) outside of the campus administrative domain 502A to nodes within the campus administrative domain (i.e., the campus network 152 and the branch office 154), and as egress edge network devices for forwarding traffic from nodes inside the campus administrative domain 502A to nodes outside of the campus administrative domain. Similarly, the WAN aggregation devices 208B can operate as ingress edge devices for receiving traffic from nodes outside of the data center administrative domain 502C to nodes inside the data center administrative domain (i.e., the data center 150), and as egress edge devices for forwarding traffic from nodes inside the data center administrative domain 502C to nodes outside of the data center administrative domain. The WAN edge devices 142 can also operate as ingress edge devices for receiving traffic from nodes outside of the WAN administrative domain 502B to nodes within the WAN administrative domain (e.g., the WAN edge devices 142 and intermediate nodes between them), and as egress edge devices for receiving traffic from nodes inside the WAN administrative domain 502B to nodes outside of the WAN administrative domain. This can be in distinction from network devices 516, which may only be able to connect to the WAN via the WAN aggregation devices 208A.

The campus network 152 can also include Authentication, Authorization, and Auditing (AAA) services 508 and a control node 510. The AAA services 508 can control access to computing resources, facilitate enforcement of network policies, audit usage, and provide information necessary to bill for services. The AAA services 508 may coordinate with the campus network controller 504, the WAN controller 132, the data center network controller 506, and databases and directories containing information for users, devices, things, policies, billing, and similar information to provide authentication, authorization, and accounting services. In this example, the AAA services 508 can function as the centralized authority for identity and access to the campus administrative domain 502A, the WAN administrative domain 502B, and the data center administrative domain 502C. However, it will be appreciated that the AAA services 508 can also be co-located in the branch office 154, the data center 150, or other networks (e.g., a co-location center, a Cloud Service Provider network (e.g., IaaS, PaaS, SaaS, etc.) in other embodiments. In still other embodiments, the AAA services 508 may be distributed across multiple administrative domains 502. The AAA services 508 can utilize various technologies, such as Remote Authentication Dial-In User Service (RADIUS), Diameter, and the like, to communicate with hosts, network devices, applications, and so on. An example of an implementation of the AAA services 508 is the Cisco® Identity Services Engine (ISE). Other examples include GOOGLE ACCOUNT or GOOGLE CLOUD IDENTITY, AMAZON WEB SERVICES (AWS) IDENTITY AND ACCESS MANAGEMENT (IAM), FACEBOOK LOGIN, MICROSOFT ACTIVE DIRECTORY or AZURE ACTIVE DIRECTORY, ARUBA CLEARPASS ACCESS MANAGEMENT SYSTEM, HUAWEI CLOUD IAM, and so forth.

User identity, group or organizational identity, user location, client device type, and other contextual information regarding users can be shared across the administrative domains 502 via the AAA services 508. For example, the AAA services 508 and/or the administrative domains 502 can share this information via Application Programming Interfaces (APIs) (e.g., Restful State Transfer (REST) APIs, Software Development Kits (SDKs) for a programming language such as C++, GO, JAVA, JAVASCRIPT, NODE.JS, PHP, PYTHON, RUBY, etc.), etc.), Command Line Interfaces (CLIs), web applications (e.g., applications accessible via web browsers), desktop applications, mobile applications or "apps," and other suitable interfaces. In some embodiments, the AAA services 508 can map user or group identifier in one representation, such as an SGT, to another representation, such as an EPG, or vice versa.

The control node 510 can operate as a central database for tracking all users, devices, and things as they attach to the campus administrative domain 502A, and as they roam around the campus. The control node 110 can allow network infrastructure (e.g., switches, routers, Wireless LAN Controllers (WLCs), etc.) to query the database to determine the locations of users, devices, and things attached to the campus administrative domain 502A instead of using a flood and learn mechanism. In this manner, the control node 510 can operate as a single source of truth about where every host attached to the campus administrative domain 502A is located at any point in time. In addition to tracking specific endpoints (e.g., /32 address for IPv4, /128 address for IPv6, etc.), the control node 510 can also track larger summarized routers (e.g., IP/mask). This flexibility can help in summarization across fabric sites and improve overall scalability. An example of an implementation of this functionality is LISP.

As shown in the multi-domain network 500 and understood by one of ordinary skill, each administrative domain 502 can be very different from one another in terms of topologies, types of nodes, primary functions and capabilities, protocols, security vulnerabilities, performance requirements, and so forth. For example, each administrative domain 502 in the multi-domain network 500 uses a separate protocol in each of a policy plane 520, a data plane 522, and a control plane 524. The campus administrative domain 502A may implement SGTs with VXLAN encapsulation for the policy plane 520, VXLAN encapsulation for the data plane 522, and LISP encapsulation for the control plane 524. The WAN administrative domain 502B can implement SGTs within a Cisco® Meta Data (CMD) header or an MPLS label for the policy plane 520, VRF-Aware IPsec (sometimes also referred to as VRF-Lite), MPLS VPN, or similar encapsulation technologies for the data plane 522, and OMP encapsulation for the control plane 524. The data center administrative domain 502C can implement EPGs with internal VXLAN (iVXLAN) encapsulation for the policy plane 520, iVXLAN encapsulation for the data plane 522, and Council of Oracles Protocol (COOP) encapsulation for the control plane 524. Despite substantial differences between these domains, it is still possible to define, deploy, and maintain end-to-end policies based on user identity or group identity awareness in the multi-domain network 500.

Figure 6:
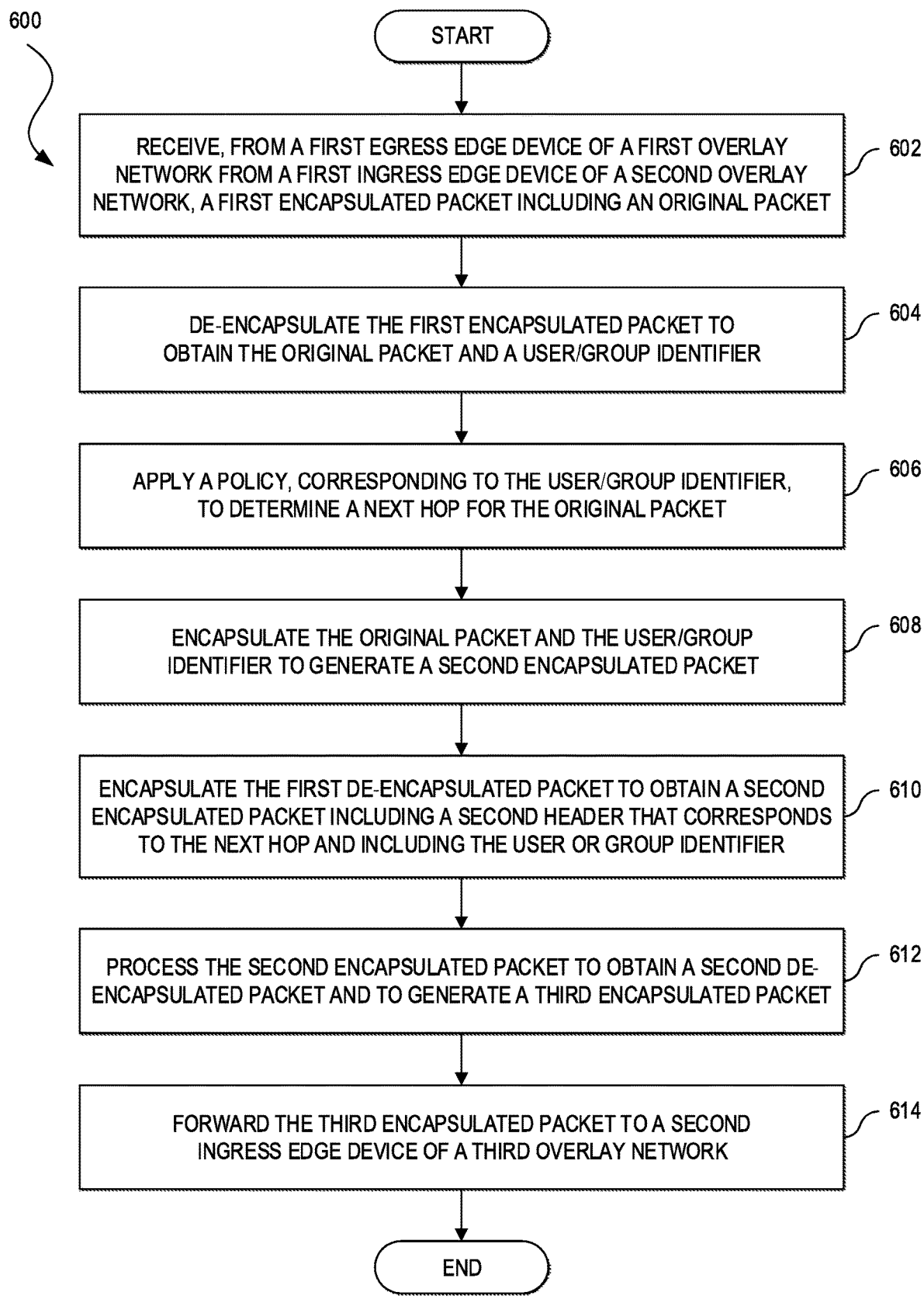
FIG. 6 illustrates an example of a process for enabling identity-aware routing across multiple administrative domains in accordance with an embodiment.

FIG. 6 illustrates an example of a process 600 for enabling identity-aware routing across multiple administrative domains. One of ordinary skill will understood that, for any processes discussed herein, there can be additional, fewer, or alternative steps performed in similar or alternative orders, or in parallel, within the scope of the various embodiments unless otherwise stated. The process 600 can be performed at least in part by one or more network controllers (e.g., the campus network controller 504, the WAN controller 132, the data center network controller 506, etc.), one or more network devices (e.g., the WAN aggregation devices 208, the WAN edge devices 142, other edge or border devices, etc.), AAA services (e.g., the AAA services 508), and hosts (e.g., the hosts 206), among other elements discussed throughout the present disclosure.

Figure 7:
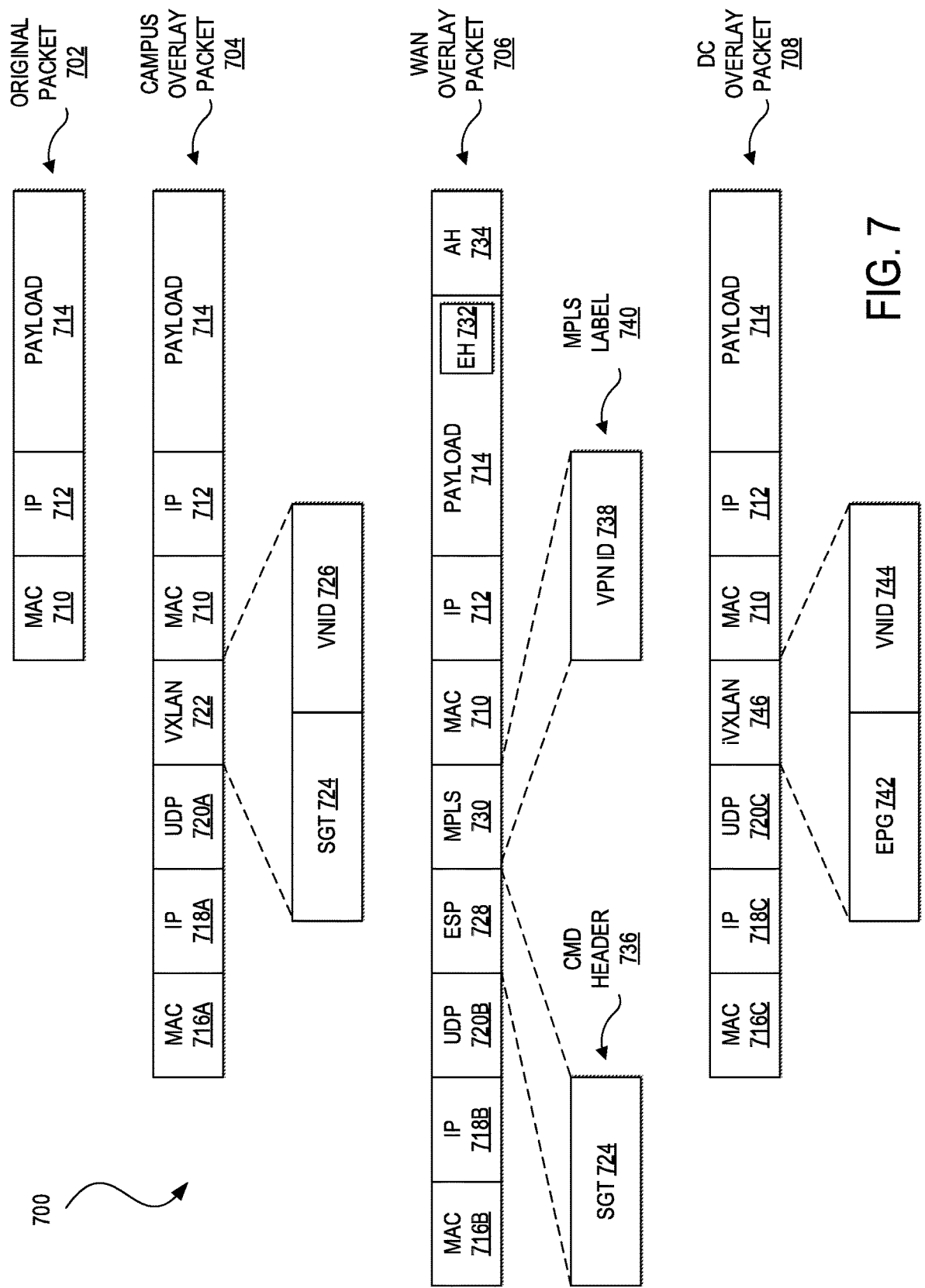
FIG. 7 illustrates examples of network packet formats that may be used for conveying user or group identifier end-to-end across multiple administrative domains in accordance with an embodiment.

The process 600 can begin with a source host (e.g., the host 206) initiating traffic from one end of a multi-domain network (e.g., the multi-domain network 500) in a first administrative domain (e.g., the campus administrative domain 502A) that may be routed through a second administrative domain (e.g., the WAN administrative domain 502B), and that is ultimately destined for a destination host in another end of the multi-domain network in a third administrative domain (e.g., the data center administrative domain 502C). For purposes of showing traffic flowing across multiple administrative domains can be affected by the process 600, FIG. 7 illustrates examples of network packet formats 700 that may be used for conveying a user or group identifier end-to-end across the multiple administrative domains. The source host can generate an original packet 702 for transmission to the destination host. The original packet 702 can be a Transmission Control Protocol (TCP)/IP packet including a Media Access Control (MAC) header 710, an IP header 712, and a payload 714. Other L2/L3 protocols may be used in other embodiments.

The path the original packet 702 can take within campus administrative domain 502A or the campus network 152 may depend on a number of factors, including network topology, network or node configuration (e.g., a default route), intra-domain policies (e.g., policies affecting routing and switching within the first administrative domain), inter-domain policies (e.g., policies affecting routing and switching between different administrative domains), and so forth. Thus, the original packet 702 can traverse zero or more nodes of the campus network 152 before arriving at a first overlay edge device (e.g., the WAN aggregation device 208A). In some embodiments, the next hop or default route for the source host can be a first overlay network device of the campus network 152. The first overlay edge device can perform an encapsulation of the original packet 702 and route the encapsulated packet to one or more next hops that may include zero or more nodes (e.g., the network devices 512) of an underlay network corresponding to the first overlay network and the first overlay edge device. The nodes in between the first overlay network device, if any, and the first overlay edge device may be referred to as underlay (or intermediate) nodes or devices because they may not necessarily be capable of de-encapsulating the encapsulated packet but are capable of conventional L2/L3 routing. In other embodiments, the default route or next hop for the host can be the first overlay edge device.

Intra-domain policies can also affect the path of the original packet from the source host to the first overlay edge device, such as access policies allowing or denying mobile devices of certain users or groups onto the first administrative domain, identity-based Quality of Service (QoS) or application policies (e.g., prioritizing traffic to an application from a Quality Assurance (QA) team during a production roll-out over traffic from a development team), and so forth. The path from the host to the first overlay edge device can also depend on inter-domain policies. For example, the first administrative domain may require certain network services (e.g., load balancing, firewalling, WAN optimization, etc.) be performed on traffic before egress.

Whether arriving circuitously (e.g., and first requiring de-encapsulation) or directly, the first overlay edge device can determine the user or group identifier, determine whether any inter-domain policies are applicable to the user or group associated with the original packet 702, apply the inter-domain policies (if any) to determine an inter-domain next hop and perform an inter-domain encapsulation on the original packet 702 to generate a first encapsulated packet 704. For example, the first overlay edge device can receive the user or group identifier and inter-domain policies from AAA services (e.g., the AAA services 508) and/or via routes from the first network controller to determine the inter-domain next hop. One type of encapsulation supporting the capability of traversing both L2/L3 networks is VXLAN- GPO, and one type of user or group identifier is an SGT. Thus, the first encapsulated packet 704 can include a VXLAN-GPO encapsulation that encapsulates the original packet 702 with an outer MAC header 716A, an outer IP header 718A, a UDP header 720A, and a VXLAN header 722. The VXLAN header 722 can include an SGT 724 for enabling user or group identity-aware routing and a VNID 726 for enabling further network segmentation. Other types of encapsulation and user or group identifiers may also be used in other embodiments.

An SGT can be assigned to a host based on the host's user, group, device, location, and other identity-based attributes. The SGT can denote the user's access entitlements, and traffic from the host can carry the SGT information. Switches, routers, firewalls, and other network devices can use SGT to make forwarding decisions based on access or security policies via classification, transport, and enforcement. Classification can map an SGT to a host, which can be accomplished either dynamically or statically. Dynamic classification can be performed at the access layer and can be done using a network access control solution (e.g., the Institute of Electric and Electronic Engineers (IEEE) 802.1X standards). The SGT can be assigned through authorization of the host. Static classification is typically performed in the data center by configuration of a network device to which data center servers are attached. Some example options for static classification include the mapping of IP address, VLAN, or port to an SGT or an equivalent user or group identifier (e.g., EPG). The SGT can follow the traffic through the network, which can be accomplished either through inline tagging or the SGT Exchange Protocol (SXP). With inline tagging, the SGT can be embedded in a packet. Because not all network devices support inline tagging, SXP can be used to transport SGT mappings across such devices. Enforcement can implement a permit or deny policy decision based on the source and destination SGTs (e.g., using Security Group ACL (SGACL) on network devices and Security Group Firewall (SGFW) on firewalls).

The first overlay edge device, operating as an egress edge device, can be configured to route traffic across the WAN by forwarding traffic to one or more edge ingress devices (e.g., the WAN edge devices 142) of a second overlay network (e.g., the WAN) under administrative control of a second administrative domain or a second network controller (e.g., the WAN controller 132). At step 602, an edge egress device of the second overlay network can receive the first encapsulated packet 704 including the original packet 702.

At step 604, the edge egress device can de-encapsulate the first encapsulated packet to obtain a de-encapsulated packet (i.e., the original packet 702) and the user or group identifier. For example, the first edge egress device may be capable of processing packets encapsulated at VXLAN-GPO, and can parse the outer MAC header 716A, the outer IP header 718A, the UDP header 720A, and the VXLAN header 722 from the first encapsulated packet 704. The first edge egress device can further process the VXLAN header 722 to extract the SGT 724 and the VNID 726. Then the edge egress device can determine whether any intra-domain or inter-domain policies are applicable to the original packet based on the user or group identifier. In some cases, this can involve a mapping of the user or group identifier in the first administrative domain to corresponding user or group identifier in the second administrative domain. In other cases, one or more of the AAA services, the first network controller, or the second network controller can expose an interface for extending identity awareness from the first administrative domain to the second administrative domain. In this example, the user or group identifier can map directly (e.g., SGT to SGT), and the egress edge device can obtain the policies applicable to the original packet 702 based on the user or group identifier.

At step 606, the edge egress device can apply a policy (e.g., an intra-domain policy or an inter-domain policy) based on the user or group identifier to determine a next hop for the de-encapsulated packet. For example, there can be an intra-domain policy to prioritize video conferencing traffic of executives over regular employees that can determine the next hop for the original packet 702. As another example, there can be an inter-domain policy to route traffic from the WAN to the data center 150 through robust IDS or IPS services unless the traffic originated from the users of the campus network 152 and in which case, the traffic may be routed through less robust IDS or IPS.

Like the path of the original packet 702 in the first administrative domain, the path in the second administrative domain can also depend on the topology of the WAN, the configuration of the WAN edge devices 142, intra-domain policies, inter-domain policies, and so on. For instance, the path through the second administrative domain can include at least a pair of the WAN edge devices 142, including an ingress WAN edge device and an egress WAN edge device. In other cases, the path may further one or more intermediate WAN edge devices. In either case, at step 608, the ingress WAN edge device can encapsulate the first de-encapsulated packet to obtain a second encapsulated packet 706 including a second header that corresponds to the next hop and including the user or group identifier. In this example, the WAN edge devices 142 can utilize VRF-Aware IPsec or MPLS VPN to obtain the second encapsulated packet 706.

VRF-Aware IPsec can be used for IPsec tunneling between VRFs or MPLS VPNs using a single public-facing address. A VRF can represent a per-VPN routing information repository that defines the VPN membership of a WAN site (e.g., the WAN site 204) attached to a WAN edge device (e.g., the WAN edge device 142). A VRF can include an IP routing table, a forwarding table (e.g., derived from Cisco® Express Forwarding (CEF)), a set of interfaces that use the forwarding table, and a set of rules and routing protocol parameters that control the information that is included in the routing table. A separate set of routing and CEF tables can be maintained for each VPN. VRF-Aware IPsec defines an IPsec tunnel for two VRF (or MPLS VPN) domains, a Front Door VRF (FVRF) represented by the outer encapsulated packet and an Inside VRF (IVRF) represented by the inner, protected IP packet. That is, the local node of the IPsec tunnel can belong to the FVRF while the source and destination addresses of the inside packet can belong to the IVRF. From the perspective of the FVRF, a VPN packet can arrive from a Service Provider MPLS backbone network to a Provider Edge (PE) device (e.g., one or more intermediate nodes of the second administrative domain) and may be routed through an interface facing the Internet. The packet can be matched against a Security Policy Database (SPD), and the packet is IPsec encapsulated. The SPD can include the IVRF and the ACL. The IPsec-encapsulated packet can then be forwarded using the FVRF routing table. From the perspective of the IVRF, an IPsec-encapsulated packet can arrive at the PE device from the remote IPsec endpoint. IPsec can perform a Security Association (SA) lookup for the Security Parameter Index (SPI), destination, and protocol. The packet can be de-encapsulated using the SA and then associated with the IVRF. The packet can be forwarded using the IVRF routing table. IPsec can perform a Security Association (SA) lookup for the Security Parameter Index (SPI), destination, and protocol.

Pairs of the WAN edge devices 142 can establish an IPsec tunnel between them before exchanging data traffic. However, instead of utilizing Internet Key Exchange (IKE), the WAN edge devices 142 can exchange data plane keys via the DTLS/TLS tunnels 304. Each WAN edge device 142 can periodically generate an Advanced Encryption Standard (AES) key for its data path (e.g., one key per TLOC) and transmit the key to the WAN controller 132 within OMP routes. These packets can include information that the WAN controller 132 uses to determine the network topology, including the each WAN edge device's TLOC and AES key. The WAN controller 132 can send the OMP routes as reachability advertisements to other WAN edge network devices. In this manner, the WAN controller 132 can distribute the AES keys for the WAN edge devices 142 across the WAN. Although the key exchange is symmetric, the WAN controller 132 can key exchange asymmetrically to simplify and improve scalability of the key exchange process and avoid the use of per-pair keys.

In some embodiments, pairs of WAN edge devices 142 can encrypt an MPLS header 730 including a VPN identifier 738, a metadata header (e.g., CMD) 732, the inner MAC header 710, the inner IP header 712, the payload 714, and a portion of an IPSec trailer 734 and to authenticate an IPSec header 728, the MPLS header 730, the metadata header 732, the inner MAC header 710, the inner IP header 712, the payload 714, and a portion of the IPSec trailer 734. For example, the first of the pair of WAN edge devices 142 (e.g., the ingress WAN edge device or the penultimate WAN edge device) can use IPSec to encrypt the MPLS header 730, the metadata header 732, the inner headers 710 and 712, and the payload 714, and to place the computed encryption hash or digest at the end of the payload 714 into the IPSec trailer 734. The first of the pair of WAN edge devices 142 can also apply an authentication process on the IPSec header 728, the MPLS header 730 (including the VPN identifier 736), the metadata header 732 (including the SGT 724), the inner MAC header 710, the inner IP header 712, the payload 714, and the portion of the IPSec trailer 734 including encryption hash or digest data, to generate authentication hash or digest data and append at the end of the packet. The second of the pair of WAN edge devices 142 (e.g., the egress or last WAN edge device) can perform the same checksums and accept packets whose checksums match and drop those that don't match.

In this example, the VPN identifier 736 is encapsulated as an MPLS label in the MPLS header 730, and the SGT 724 can be encapsulated as a metadata field in the metadata header 732. In other embodiments, both the VPN identifier 738 and the SGT 724 may be encapsulated as MPLS labels. Various other combinations can also be used in other embodiments.

The process 600 may continue to step 610 in which the second encapsulated packet can be forwarded to its next hop. As discussed, the next hop can be an intermediate WAN edge device, in which case each WAN edge device can encrypt and require authentication at each node of the path until the original packet arrives at the last or egress WAN edge device.

At step 612, the egress WAN edge device can process the IPsec-encapsulated packet received from a penultimate WAN edge device to obtain (at least) a second de-encapsulated packet. This can include de-encapsulation, decryption, and authentication of the IPsec-encapsulated packet to obtain the original packet 702, the SGT 724, and the VPN identifier 738. This can also include mapping the SGT to an EPG 742 or equivalent user or group identifier and the VPN identifier 738 to a VNID 744, applying any applicable policies to determine a second inter-domain next hop based on the user or group identifier, and encapsulating the original packet 702, the EPG 742, and the VNID 744. In some embodiments, the egress WAN edge device can apply iVXLAN encapsulation on the second de-encapsulated packet to obtain (at least) a third encapsulated packet 708. For example, the third encapsulated packet can include (at least) a third outer MAC header 716C, a third outer IP header 718C, a third UDP header 720C, an iVXLAN header 746, the inner MAC header 710, the inner IP header 712, and the payload 714. The iVXLAN header 746 can include the EPG 742 and the VNID 744.

The process 600 can conclude with step 614 in which the egress WAN edge device can forward the third encapsulated packet to an ingress edge device (e.g., the WAN aggregation devices 208B) of a third administrative domain (e.g., the data center administrative domain 502C). The ingress edge device may receive the third encapsulated packet, de-encapsulate the third encapsulated to obtain (at least) a fourth de-encapsulated packet (e.g., the original packet 702), user or group identifier (e.g., the EPG 742, and a virtual network identifier (e.g., the VNID 744), apply any policies applicable to the original packet based on the user or group identifier, and forward the original packet to the destination host. A similar process can be performed in reverse for routing return traffic. Other embodiments may include administrative domains or networks having different topologies (e.g., campus-WAN-branch, DC-WAN-DC, campus-DC, DC-WAN-branch, etc.), additional administrative domains (including external domains or domains not under administrative control of a single network operator), fewer administrative domains, and so forth but one of ordinary skill in the art will understand how to apply the teachings of the present disclosure to these other embodiments.

In some embodiments, a network can include an interface (e.g., REST API, SDK, CLI, web application, desktop application, etc.) for defining policies that can be applied across multiple administrative domains. For example, an administrator can utilize the interface to define a single policy that is applicable end-to-end across each administrative domain, a single policy that is applicable across two or more administrative domains and one or more additional policies that applicable for additional administrative domains, separate policies for each domain, policies that can combine multiple identity-based attributes (e.g., application and identity, QoS and group identity, user identity and location, etc.), and various other combinations. The interface can parse the policies and present analyses regarding policies that may be in conflict with one another, suggestions on how to prioritize policies, suggestions on combining policies, suggestions on improving policies where there may be security gaps, and so forth.

As discussed, conventional application-aware routing may be limited to coarse traffic classification based on packet header information (e.g., destination address, port) and/or deep packet inspection. That is, conventional application-aware routing may support a policy that all traffic for a particular application should be routed over a particular path. However, by using the techniques discussed in the present disclosure, a network operator can define more granular application-aware policies by also accounting for a user/group along with the application for selecting the optimal path across one or more administrative domains. For example, the network operator can define policies that route traffic between a guest user and a specific SaaS network to over an Internet path, route traffic between an engineer and the SaaS network over MPLS, and route traffic between an IoT device and the SaaS network provider over LTE path.

Figure 8:
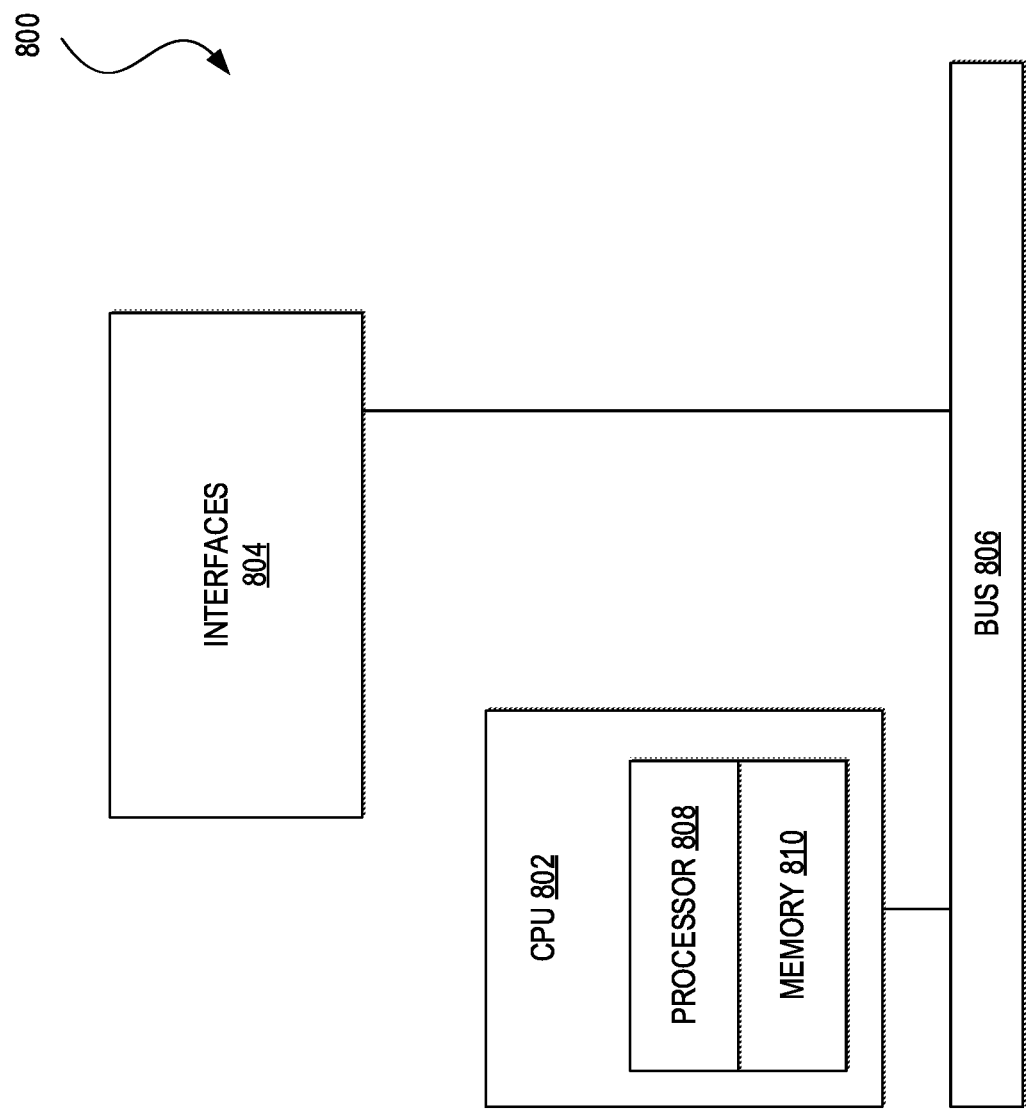
FIG. 8 illustrates a block diagram of an example of a network device in accordance with an embodiment.

FIG. 8 illustrates an example of a network device 800 (e.g., switch, router, network appliance, etc.). The network device 800 can include a master central processing unit (CPU) 802, interfaces 804, and a bus 806 (e.g., a Peripheral Component Interconnect (PCI) bus). When acting under the control of appropriate software or firmware, the CPU 802 can be responsible for executing packet management, error detection, and/or routing functions. The CPU 802 preferably accomplishes all these functions under the control of software including an operating system and any appropriate applications software. The CPU 802 may include one or more processors 808 such as a processor from the Motorola family of microprocessors or the Microprocessor without Interlocked Pipelined Stages (MIPS) family of microprocessors. In an alternative embodiment, the processor 808 can be specially designed hardware for controlling the operations of the network device 800. In an embodiment, a memory 810 (such as non-volatile Random Access Memory (RAM) and/or Read-Only Memory (ROM)) can also form part of the CPU 802. However, there are many different ways in which memory could be coupled to the system.

The interfaces 804 can be provided as interface cards (sometimes referred to as line cards). The interfaces 804 can control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 804 may include ports appropriate for communication with the appropriate media. In some cases, the interfaces 804 may also include an independent processor and, in some instances, volatile RAM. The independent processors may control communication intensive tasks such as packet switching, media control, and management. By providing separate processors for the communication intensive tasks, the interfaces 804 may allow the CPU 802 to efficiently perform routing computations, network diagnostics, security functions, and so forth.

Although the system shown in FIG. 8 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 800.

Regardless of the network device's configuration, it may employ one or more memories or memory modules (including the memory 810) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 9A:
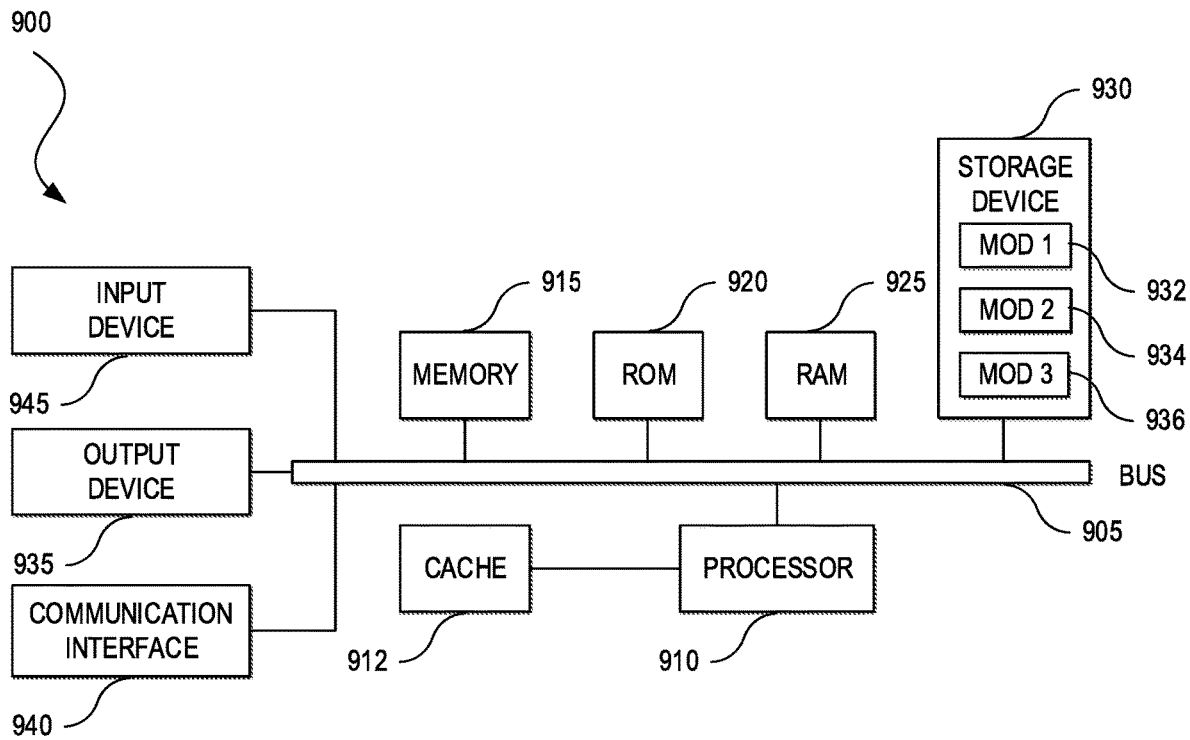
FIGS. 9A and 9B illustrate block diagrams of examples of computing systems in accordance with some embodiments.
Figure 9B:
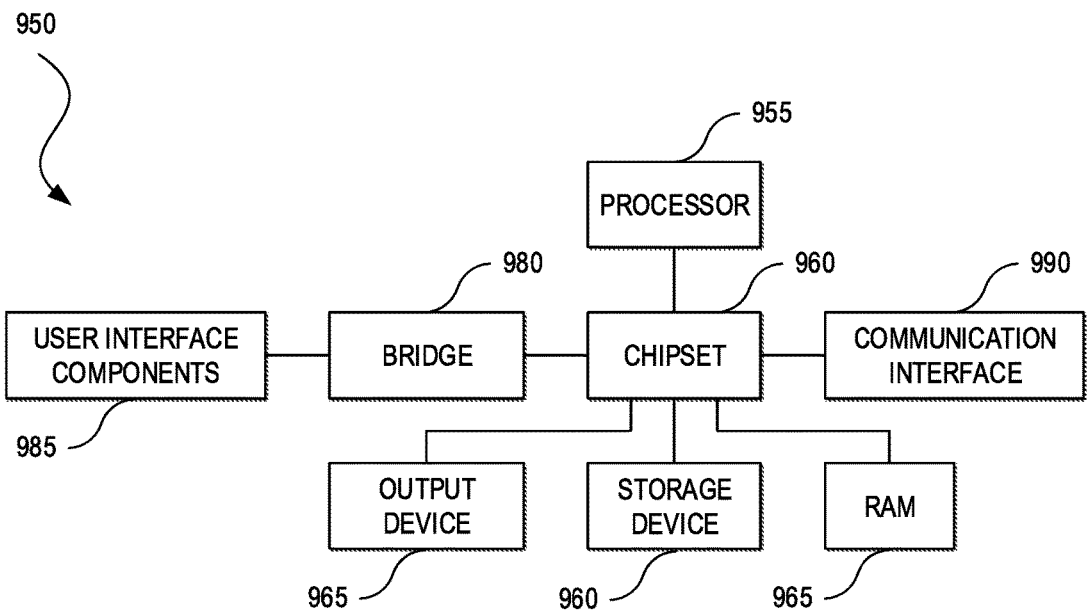

FIG. 9A and FIG. 9B illustrate systems in accordance with various embodiments. The more appropriate system will be apparent to those of ordinary skill in the art when practicing the various embodiments. Persons of ordinary skill in the art will also readily appreciate that other systems are possible.

FIG. 9A illustrates an example of a bus computing system 900 wherein the components of the system are in electrical communication with each other using a bus 905. The computing system 900 can include a processing unit (CPU or processor) 910 and a system bus 905 that may couple various system components including the system memory 915, such as read only memory (ROM) 920 and random access memory (RAM) 925, to the processor 910. The computing system 900 can include a cache 912 of high-speed memory connected directly with, in close proximity to, or integrated as part of the processor 910. The computing system 900 can copy data from the memory 915, ROM 920, RAM 925, and/or storage device 930 to the cache 912 for quick access by the processor 910. In this way, the cache 912 can provide a performance boost that avoids processor delays while waiting for data. These and other modules can control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in the storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing system 900, an input device 945 can represent any number of input mechanisms, such as a microphone for speech, a touch-protected screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing system 900. The communications interface 940 can govern and manage the user input and system output. There may be no restriction on operating on any particular hardware arrangement and therefore the basic features here may easily be substituted for improved hardware or firmware arrangements as they are developed.

The storage device 930 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 930 can include the software modules 932, 934, 936 for controlling the processor 910. Other hardware or software modules are contemplated. The storage device 930 can be connected to the system bus 905. In some embodiments, a hardware module that performs a particular function can include a software component stored in a computer-readable medium in connection with the necessary hardware components, such as the processor 910, bus 905, output device 935, and so forth, to carry out the function.

FIG. 9B illustrates an example architecture for a chipset computing system 950 that can be used in accordance with an embodiment. The computing system 950 can include a processor 955, representative of any number of physically and/or logically distinct resources capable of executing software, firmware, and hardware configured to perform identified computations. The processor 955 can communicate with a chipset 960 that can control input to and output from the processor 955. In this example, the chipset 960 can output information to an output device 965, such as a display, and can read and write information to storage device 970, which can include magnetic media, solid state media, and other suitable storage media. The chipset 960 can also read data from and write data to RAM 975. A bridge 980 for interfacing with a variety of user interface components 985 can be provided for interfacing with the chipset 960. The user interface components 985 can include a keyboard, a microphone, touch detection and processing circuitry, a pointing device, such as a mouse, and so on. Inputs to the computing system 950 can come from any of a variety of sources, machine generated and/or human generated.

The chipset 960 can also interface with one or more communication interfaces 990 that can have different physical interfaces. The communication interfaces 990 can include interfaces for wired and wireless Local Area Networks (LANs), for broadband wireless networks, as well as personal area networks. Some applications of the methods for generating, displaying, and using the technology disclosed herein can include receiving ordered datasets over the physical interface or be generated by the machine itself by the processor 955 analyzing data stored in the storage device 970 or the RAM 975. Further, the computing system 950 can receive inputs from a user via the user interface components 985 and execute appropriate functions, such as browsing functions by interpreting these inputs using the processor 955.

It will be appreciated that computing systems 900 and 950 can have more than one processor 910 and 955, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial Bus (USB) devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
receiving, from an egress edge device of a first overlay network under administrative control of a first network controller by an ingress edge device of a second overlay network under administrative control of a second network controller, a first encapsulated packet including an original packet;
de-encapsulating, by the ingress edge device of the second overlay network, the first encapsulated packet to obtain the original packet and a user or group identifier;
applying, by the ingress edge device of the second overlay network, a user or group policy matching the user or group identifier to the original packet to determine a next hop for the original packet;
encapsulating, by the ingress edge device of the second overlay network, the original packet and the user or group identifier to generate a second encapsulated packet; and
forwarding, by the ingress edge device of the second overlay network, the second encapsulated packet to the next hop.

2. The computer-implemented method of claim 1, wherein at least one of the first encapsulated packet or the second encapsulated packet is encapsulated by Virtual Extensible Local Area Network (VXLAN)-Group Policy Option (GPO) encapsulation.

3. The computer-implemented method of claim 1, wherein the user or group policy is an end-to-end user or group policy that is enforced in the first overlay network and the second overlay network.

4. The computer-implemented method of claim 1, wherein the user or group identifier is included in at least one of a VXLAN header, a metadata header, or a Multi-Protocol Label Switching (MPLS) label of the first encapsulated packet of the second encapsulated packet.

5. The computer-implemented method of claim 1, wherein at least one of the first encapsulated packet or the second encapsulated packet includes a Virtual Network Identifier (VNID), a Virtual Routing and Forwarding (VRF) identifier, or a Virtual Private Network (VPN) identifier.

6. The computer-implemented method of claim 1, further comprising:
 establishing a tunnel between the ingress edge device and an egress edge device of the second overlay network, wherein the second encapsulated packet is forwarded to the next hop through the tunnel.

7. The computer-implemented method of claim 1, further comprising:
 receiving, by an egress edge device of the second overlay network, the second encapsulated packet;
 de-encapsulating the second encapsulated packet to obtain the original packet and the user or group identifier;
 applying a second user or group policy matching the user or group identifier to the original packet to determine a second next hop for the original packet;
 encapsulating the original packet and the user or group identifier to generate a third encapsulated packet; and
 forwarding the third encapsulated packet to the second next hop.

8. The computer-implemented method of claim 7, further comprising:
 receiving, by a second ingress edge device under administrative control of the first overlay network or a third overlay network from the egress edge device, the third encapsulated packet;
 de-encapsulating the third encapsulated packet to obtain the original packet and the user or group identifier;
 applying a third user or group policy matching the user or group identifier to the original packet to determine a third next hop for the original packet; and
 forwarding the original packet to the third next hop.

9. The computer-implemented method of claim 1, further comprising:
 mapping the user or group identifier from in a Security Group Tag (SGT) to an Endpoint Group (EPG).

10. The computer-implemented method of claim 1, wherein the user or group policy further matches an application that generated the original packet.

11. The computer-implemented method of claim 1, further comprising:
 routing the first encapsulated packet through one or more intermediate nodes of an underlay network to the first overlay network.

12. The computer-implemented method of claim 1, further comprising:
 routing the second encapsulated packet through one or more nodes of an underlay network to the second overlay network.

13. A system, comprising:
 one or more processors; and
 memory including instructions that, when executed by the one or more processors, cause the system to:
  receive, from an egress edge device of a first overlay network under administrative control of a first network controller, a first encapsulated packet including an original packet, wherein the system is an ingress edge device of a second overly network and under administrative control of a second network controller;
  de-encapsulate the first encapsulated packet to obtain the original packet and a user or group identifier;
  apply a user or group policy matching the user or group identifier to the original packet to determine a next hop for the original packet;
  encapsulate the original packet and the user or group identifier to generate a second encapsulated packet; and
  forward the second encapsulated packet to the next hop.

14. The system of claim 13, further comprising further instructions that, when executed by the one or more processors, further cause the system to:
 establish a tunnel with an egress edge device under administrative control of the second network controller, wherein the second encapsulated packet is forwarded to the next hop through the tunnel.

15. The system of claim 13, further comprising further instructions that, when executed by the one or more processors, further cause the system to:
 map the user or group identifier in a Security Group Tag (SGT) to an Endpoint Group (EPG).

16. The system of claim 13, wherein the user or group policy further matches an application that generated the original packet.

17. A non-transitory computer-readable storage medium including instructions that, when executed by one or more processors of a system, cause the system to:
 receive, from an egress edge device of a first overlay network under administrative control of a first network controller, a first encapsulated packet including an original packet, wherein the system is an ingress edge device of a second overly network and under administrative control of a second network controller;
 de-encapsulate the first encapsulated packet to obtain the original packet and a user or group identifier;
 apply a user or group policy matching the user or group identifier to the original packet to determine a next hop for the original packet;
 encapsulate the original packet and the user or group identifier to generate a second encapsulated packet; and
 forward the second encapsulated packet to the next hop.

18. The non-transitory computer-readable storage medium of claim 17, wherein at least one of the first encapsulated packet or the second encapsulated packet is encapsulated by Virtual Extensible Local Area Network (VXLAN)-Group Policy Option (GPO) encapsulation.

19. The non-transitory computer-readable storage medium of claim 17, wherein the user or group identifier is included in at least one of a VXLAN header, a metadata header, or a Multi-Protocol Label Switching (MPLS) label of the first encapsulated packet of the second encapsulated packet.

* * * * *

UNITED STATES PATENT AND TRADEMARK OFFICE
CERTIFICATE OF CORRECTION

PATENT NO. : 10,999,197 B2
APPLICATION NO. : 16/535519
DATED : May 4, 2021
INVENTOR(S) : Hooda et al.

Page 1 of 1

It is certified that error appears in the above-identified patent and that said Letters Patent is hereby corrected as shown below:

In the Claims

Column 27, Lines 4-5, Claim 4, "of the first encapsulated packet of the second encapsulated packet" should be corrected to read -- of the first encapsulated packet or the second encapsulated packet --.

Column 28, Lines 61-62, Claim 19, "of the first encapsulated packet of the second encapsulated packet" should be corrected to read -- of the first encapsulated packet or the second encapsulated packet --.

Signed and Sealed this
Twentieth Day of February, 2024

Katherine Kelly Vidal
*Director of the United States Patent and Trademark Office*